(12) United States Patent
Uchida et al.

(10) Patent No.: US 8,330,709 B2
(45) Date of Patent: Dec. 11, 2012

(54) ILLUMINATING DEVICE AND DISPLAY UNIT

(75) Inventors: Tatsuo Uchida, Miyagi (JP); Takahiro Ishinabe, Miyagi (JP); Tohru Kawakami, Miyagi (JP); Kentaro Okuyama, Miyagi (JP); Harumi Sato, Miyagi (JP)

(73) Assignees: Sony Corporation, Tokyo (JP); Tohoku University, Miyagi (JP)

( * ) Notice: Subject to any disclaimer, the term of this patent is extended or adjusted under 35 U.S.C. 154(b) by 262 days.

(21) Appl. No.: 12/916,906

(22) Filed: Nov. 1, 2010

(65) Prior Publication Data

US 2011/0109663 A1    May 12, 2011

(30) Foreign Application Priority Data

Nov. 6, 2009 (JP) ................................ P2009-255260
Apr. 6, 2010 (JP) ................................ P2010-088174

(51) Int. Cl.
*G09G 3/36* (2006.01)

(52) U.S. Cl. .............................. 345/102; 345/87; 349/88

(58) Field of Classification Search ..................... 345/87, 345/102; 349/25, 88
See application file for complete search history.

(56) References Cited

U.S. PATENT DOCUMENTS

| | | | |
|---|---|---|---|
| 6,266,113 B1 * | 7/2001 | Yamazaki et al. | 349/115 |
| 7,570,310 B2 * | 8/2009 | Harada et al. | 345/87 |

FOREIGN PATENT DOCUMENTS

| | | |
|---|---|---|
| JP | 06-347790 | 12/1994 |
| JP | 3479493 | 10/2003 |

* cited by examiner

*Primary Examiner* — Kevin M Nguyen
(74) *Attorney, Agent, or Firm* — K&L Gates LLP

(57) ABSTRACT

An illuminating device capable of improving display luminance while decreasing light leakage in a range with a large view angle and a display unit are provided. In a light modulation device bonded to a light guide plate, a light modulation layer containing a bulk and microparticles is provided. Both the bulk and the microparticles have optical anisotropy, and each response speed to an electric field is different from each other. Thereby, by controlling the electric field, each optical axis orientation of the bulk and the microparticles is able to correspond with each other, or is able to be different from each other.

20 Claims, 19 Drawing Sheets

ILLUMINATING DEVICE AND DISPLAY UNIT

CROSS REFERENCES TO RELATED APPLICATIONS

The present application claims priority to Japanese Priority Patent Applications JP 2009-255260 filed in the Japanese Patent Office on Nov. 6, 2009, and Japanese Priority Patent Application JP 2010-088174 filed in the Japanese Patent Office on Apr. 6, 2010, the entire contents of which are hereby incorporated by references.

BACKGROUND

The present application relates to an illuminating device including a light modulation device showing scattering characteristics or transparency to light and a display unit.

In recent years, high image quality and energy saving of a liquid crystal display have been suddenly progressed. A method of realizing improvement of dark place contrast by partially modulating light intensity of a backlight has been proposed. In this method, mainly backlight light is modulated according to the display image by partially driving a Light Emitting Diode (LED) used as a light source of the backlight. Further, in a large-screen liquid crystal display, a thinner display has been increasingly demanded as in a small-screen liquid display. Thus, instead of the system in which a Cold Cathode Fluorescent Lamp (CCFL) or an LED is arranged directly below a liquid crystal panel, the edge light system in which a light source is arranged in an end section of a light guide plate has attracted attention. However, in the edge light system, it is difficult to perform partial driving for partially modulating light intensity of the light source.

SUMMARY

As a technology of extracting light that propagates in a light guide plate, for example, Japanese Unexamined Patent Application Publication No. 6-347790 proposes a display unit using Polymer Dispersed Liquid Crystal (PDLC) that switches between transparency and scattering. Such a technology is intended to prevent reflection or the like, and is a technology to switch between transparency and scattering by partially applying a voltage to the PDLC. However, in this system, in the case where the PDLC is in a transparent state in the front face direction (normal line direction of the PDLC), part of the light diagonally propagating in the light guide plate is scattered by a refractive index difference between a liquid crystal material and a polymer material. Thus, light is leaked in a region of a large view angle, and view angle characteristics deteriorate. Thus, to improve the view angle characteristics, for example, the light leaked in a diagonal direction may be absorbed into a polarization plate (refer to Japanese Patent No. 3479493).

However, in the foregoing method, since the light leaked in the diagonal direction is absorbed into the polarization plate, there has been a disadvantage that display becomes dark.

In view of the foregoing disadvantage, in the application, it is desirable to provide an illuminating device capable of improving display luminance while decreasing light leakage in a range of a large view angle and a display unit.

According to an embodiment, there is provided a first illuminating device including a light guide plate, a light source arranged on a side face of the light guide plate, and a light modulation device that is arranged on a surface or an inside of the light guide plate and that is bonded to the light guide plate. The light modulation device has a pair of transparent substrates that is distanced from each other and arranged opposite to each other, a pair of electrodes provided on each surface of the pair of transparent substrates, and a light modulation layer provided in a gap between the pair of transparent substrates. The light modulation layer has a first region and a second region that have optical anisotropy and that have each response speed to an electric field different from each other. The first region has a structure in which an optical axis of the first region is in parallel with a light incident face into which light of the light source enters of side faces of the light guide plate and crosses with the surface of the transparent substrates at a first angle when a voltage is not applied between the pair of electrodes. Further, the first region has a structure in which the optical axis of the first region is in parallel with the light incident face and crosses with the surface of the transparent substrates at a second angle larger than the first angle when a voltage is applied between the pair of electrodes. Meanwhile, the second region has a structure in which an optical axis of the second region is in parallel with the light incident face and crosses with the surface of the transparent substrates at the first angle without relation to presence of voltage application between the pair of electrodes.

According to an embodiment, there is provided a first display unit including a display panel that has a plurality of pixels arranged in a matrix state in which the plurality of pixels are driven based on an image signal and an illuminating device that illuminates the display panel. The illuminating device mounted on the display unit has the same component elements as those of the first illuminating device.

In the first illuminating device and the first display unit of the an embodiment, the light modulation layer including the first region and the second region is provided in the light modulation device bonded to the light guide plate. The first region and the second region have optical anisotropy, and the foregoing alignment characteristics to an electric field. Thereby, by controlling an electric field, optical axis orientation of the first region is able to correspond with that of the second region, or is able to be different from that of the second region. Thus, for example, in the case where both ordinary light refractive indices are approximated to each other, both extraordinary light refractive indices are approximated to each other, and optical axis orientation of the first region corresponds with that of the second region by controlling an electric field, refractive index difference is decreased in all directions including the front face direction and diagonal directions, and high transparency is able to be obtained. Further, for example, in the case where the optical axis orientation of the first region crosses with (or is orthogonal to) the optical axis orientation of the second region by controlling an electric field, refractive index difference is increased in all directions including the front face direction and diagonal directions, and high scattering characteristics are able to be obtained.

According to an embodiment, there is provided a second illuminating device including a light guide plate, a light source arranged on a side face of the light guide plate, and a light modulation device that is arranged on a surface or an inside of the light guide plate and that is bonded to the light guide plate. The light modulation device has a pair of transparent substrates that is distanced from each other and arranged opposite to each other, a pair of electrodes provided on each surface of the pair of transparent substrates, and a light modulation layer provided in a gap between the pair of transparent substrates. The light modulation layer has a third region and a fourth region that have optical anisotropy and that have each response speed to an electric field different from each other. The third region has a structure in which an optical axis of the third region is in parallel with a light incident face into which light of the light source enters of side faces of the light guide plate and crosses with the surface of the transparent substrates at a third angle when a voltage is not applied between the pair of electrodes. Further, the third region has a structure in which the optical axis of the third region is in parallel with the light incident face and crosses with the surface of the transparent substrates at a fourth angle smaller than the third angle or is in parallel with the surface of the transparent substrate when a voltage is applied between the pair of electrodes. Meanwhile, the fourth region has a structure in which an optical axis of the fourth region is in parallel with the light incident face and crosses with the surface of the transparent substrates at the third angle without relation to presence of voltage application between the pair of electrodes.

According to an embodiment, there is provided a second display panel that has a plurality of pixels arranged in a matrix state in which the plurality of pixels are driven based on an image signal and an illuminating device that illuminates the display panel. The illuminating device mounted on the display unit has the same component elements as those of the second illuminating device.

In the second illuminating device and the second display unit of the embodiment, the light modulation layer including the third region and the fourth region is provided in the light modulation device bonded to the light guide plate. The third region and the fourth region have optical anisotropy, and the foregoing alignment characteristics to an electric field. Thereby, by controlling an electric field, optical axis orientation of the third region is able to correspond with that of the fourth region, or is able to be different from that of the fourth region. Thus, for example, in the case where both ordinary light refractive indices are approximated to each other, both extraordinary light refractive indices are approximated to each other, and optical axis orientation of the third region corresponds with that of the fourth region by controlling an electric field, refractive index difference is decreased in all directions including the front face direction and diagonal directions, and high transparency is able to be obtained. Further, for example, in the case where the optical axis orientation of the third region crosses with (or is orthogonal to) the optical axis orientation of the fourth region by controlling an electric field, refractive index difference is increased in all directions including the front face direction and diagonal directions, and high scattering characteristics are able to be obtained.

In the first illuminating device and the first display unit according to the embodiment, by controlling an electric field, optical axis orientation of the first region corresponds with that of the second region, or becomes different from that of the second region. Thereby, high transparency is able to be obtained in all directions, and high scattering characteristics are able to be obtained. Thereby, leaked light in a range of large view angle is able to be decreased or is able to be almost eliminated in dark state. Further, due to the high scattering characteristics, partially light state section is able to be lightened. Furthermore, by the decreased portion of leaked light amount, the partially light state section is able to be more lightened. Thus, in the an embodiment, while leaked light in a range of large view angle is decreased or is almost eliminated, display luminance is able to be improved.

In the second illuminating device and the second display unit according to the embodiment, by controlling an electric field, optical axis orientation of the third region corresponds with that of the fourth region, or becomes different from that of the fourth region. Thereby, high transparency is able to be obtained in all directions, and high scattering characteristics are able to be obtained. Thereby, leaked light in a range of large view angle is able to be decreased or is able to be almost eliminated in dark state. Further, due to the high scattering characteristics, partially light state section is able to be lightened. Furthermore, by the decreased portion of leaked light amount, the partially light state section is able to be more lightened. Thus, in the embodiment, while leaked light in a range of large view angle is decreased or is almost eliminated, display luminance is able to be improved.

Additional features and advantages are described herein, and will be apparent from the following Detailed Description and the figures.

DETAILED DESCRIPTION

An embodiment will be described in detail with reference to the drawings. The description will be given in the following order.

Figure 1A:
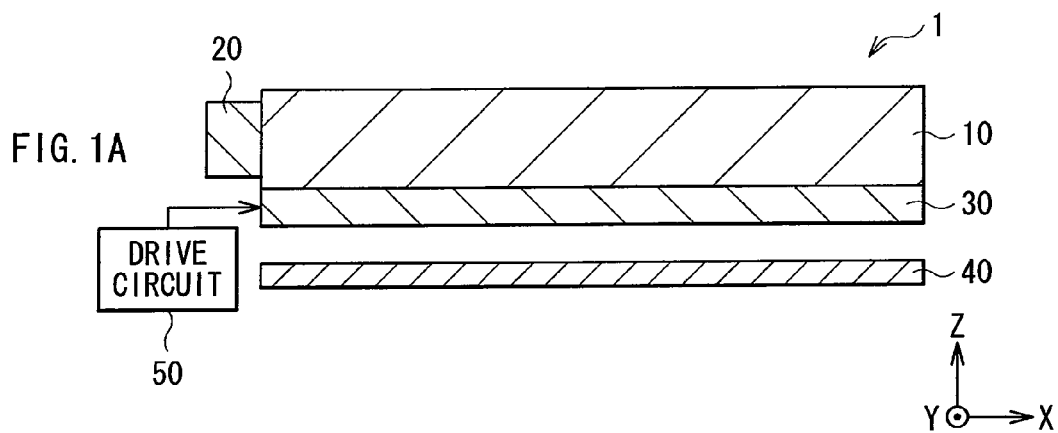
FIGS. 1A and 1B are cross sectional views illustrating an example of a structure of a backlight according to a first embodiment.
Figure 1B:
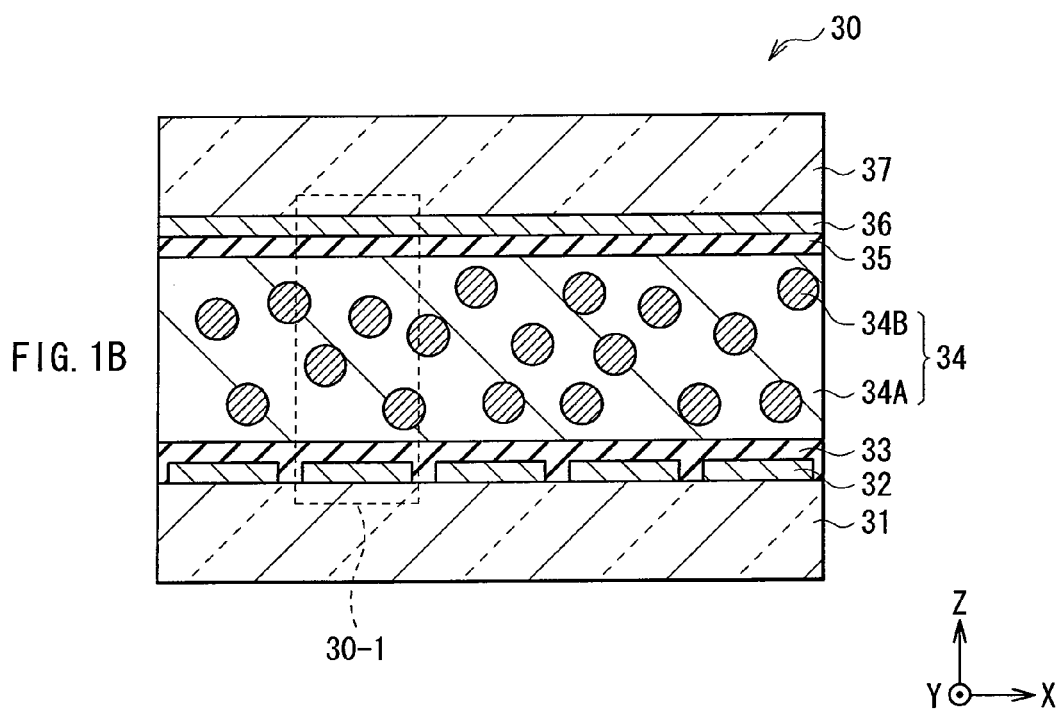

1. First embodiment (backlight and light modulation device (horizontal alignment PDLC))
2. Second embodiment (backlight and light modulation device (vertical alignment PDLC))
3. Modified example (position of light modulation device and addition of optical sheet)
4. Anisotropic diffusion
5. Application example (display unit)
6. Examples First Embodiment FIG. 1A illustrates an example of a cross sectional structure of a backlight 1 (illuminating device) according to a first embodiment. FIG. 1B illustrates an example of a cross sectional structure of the backlight 1 of FIG. 1A. FIGS. 1A and 1B are schematic views, and the dimensions and the shapes thereof may not be the same as the actual dimensions and the actual shapes. The backlight 1 illuminates, for example, a liquid crystal display panel or the like from behind. The backlight 1 includes a light guide plate 10, a light source 20 arranged on a side face of the light guide plate 10, a light modulation device 30 and a reflective plate 40 arranged behind the light guide plate 10, and a drive circuit 50 driving the light modulation device 30.

The light guide plate 10 is intended to guide light from the light source 20 arranged on the side face of the light guide plate 10 to the upper face of the light guide plate 10. The light guide plate 10 has a shape corresponding to a display panel (not illustrated) arranged on the upper face of the light guide plate 10, for example, a rectangular solid surrounded by the upper face, the lower face, and side faces. Out of the side faces of the light guide plate 10, the side face into which the light from the light source 20 enters will be hereinafter referred to as a light incident face 10A. For example, the light guide plate 10 has a given patterned shape on at least one of the upper face and the lower face, and has a function to scatter and uniformize light that enters from the light incident face 10A. In the case where luminance is uniformized by modulating a voltage applied to the backlight 1, a non-patterned flat light guide plate is able to be used as the light guide plate 10. For example, the light guide plate 10 functions as a support medium to support an optical sheet (for example, a diffusion plate, a diffusion sheet, a lens film, a polarization split sheet or the like) arranged between the display panel and the backlight 1. For example, the light guide plate 10 mainly contains a transparent thermoplastic resin such as a polycarbonate resin (PC) and an acryl resin (polymethyl methacrylate (PMMA)).

The light source 20 is a linear light source, which is composed of, for example, a Hot Cathode Fluorescent Lamp (HCFL), a CCFL, or a plurality of LEDs that are arranged in line. In the case where the light source 20 is composed of the plurality of LEDs, all LEDs are preferably a white LED in terms of efficiency, realizing a thin device, and uniformity. The light source 20 may include, for example, a red LED, a green LED, and a blue LED. The light source 20 may be provided on only one side face of the light guide plate 10 as illustrated in FIG. 1A, or may be provided on two side faces, three side faces, or all side faces of the light guide plate 10.

The reflective plate 40 is intended to return light leaked from behind the light guide plate 10 through the light modulation device 30 to the light guide plate 10 side, and has functions such as reflection, diffusion, and scattering. Thereby, outputted light from the light source 20 is able to be effectively used, and improvement of the front luminance is facilitated. The reflective plate 40 is made of, for example, foamed PET (polyethylene terephthalate), a silver evaporated film, a multilayer reflective film, a white PET or the like.

In this embodiment, the light modulation device 30 is contacted with face behind the light guide plate 10 (lower face of the light guide plate 10) without an air layer in between. For example, the light modulation device 30 is adhered to behind the light guide plate 10 with an adhesive (not illustrated). For example, as illustrated in FIG. 1B, in the light modulation device 30, a transparent substrate 31, a lower electrode 32, an alignment film 33, a light modulation layer 34, an alignment film 35, an upper electrode 36, and a transparent substrate 37 are sequentially layered from the reflective plate 40 side.

Figure 2:
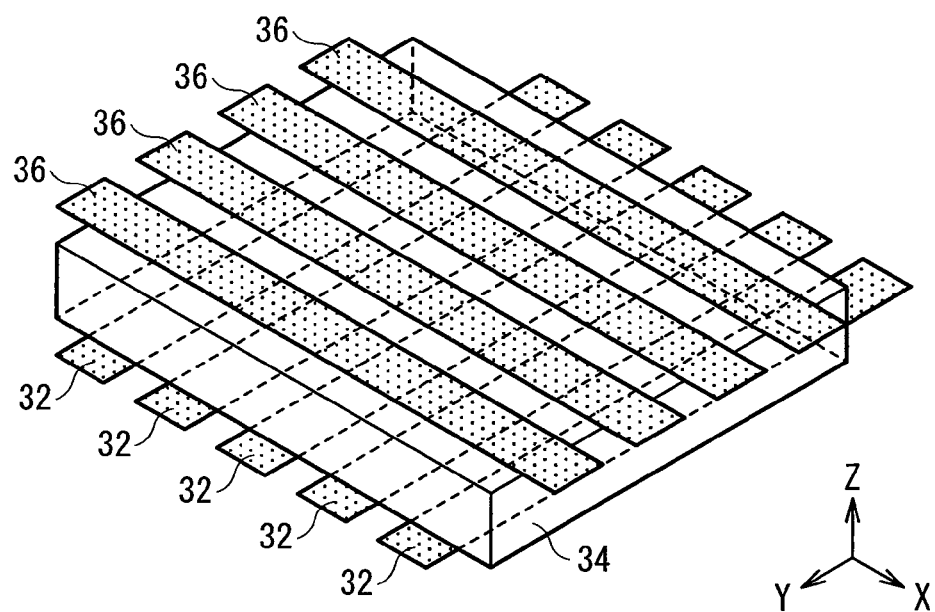
FIG. 2 is a cross sectional view illustrating an example of a structure of the electrodes of FIG. 1B.

The transparent substrates 31 and 37 support the light modulation layer 34, and are generally made of a substrate transparent to visible light such as a glass plate and a plastic film. The lower electrode 32 is provided on the face opposed to the transparent substrate 37 of the transparent substrate 31. For example, as illustrated by extracting part of the light modulation device 30 in FIG. 2, the lower electrode 32 has a strip shape extending in one in-plane direction. Further, the upper electrode 36 is provided on the face opposed to the transparent substrate 31 of the transparent substrate 37. For example, as illustrated in FIG. 2, the upper electrode 36 has a strip shape extending in the direction that is one in-plane direction and that crosses with (is orthogonal to) the extending direction of the lower electrode 32.

The shape of the lower electrode 32 and the upper electrode 36 depends on the drive system. For example, in the case where the lower electrode 32 and the upper electrode 36 have the foregoing strip shape, for example, each electrode is able to be simply matrix-driven. In the case where one electrode is formed in a solid fashion and the other electrode is formed in the shape of a minute rectangle, for example, each electrode is able to be active matrix-driven. In the case where one electrode is formed in a solid fashion and the other electrode is formed in a state of block provided with a fine leading line, for example, segment drive system in which each division block is able to be independently driven is able to be adopted.

Figure 3:
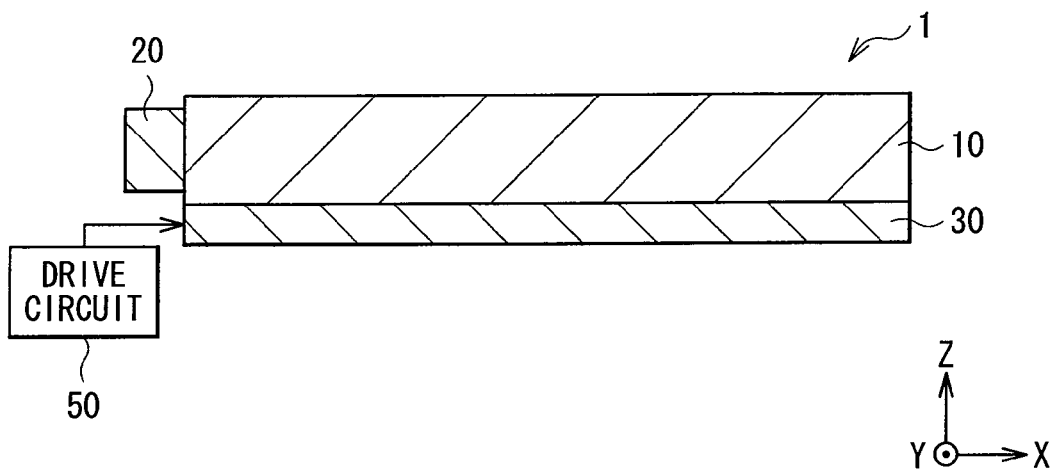
FIG. 3 is a cross sectional view illustrating another example of a structure of the backlight of FIG. 1A.

At least the upper electrode 36 (electrode on the upper face side of the backlight 1) out of the lower electrode 32 and the upper electrode 36 is composed of a transparent conductive material such as Indium Tin Oxide (ITO). The lower electrode 32 (electrode on the lower face side of the backlight 1) is not necessarily made of a transparent material, and may be, for example, made of a metal. In the case where the lower electrode 32 is made of a metal, the lower electrode 32 also has a function to reflect light entering from behind the light guide plate 10 into the light modulation device 30 as the reflective plate 40 does. Thus, in this case, for example, as illustrated in FIG. 3, the reflective plate 40 is able to be omitted.

When the lower electrode 32 and the upper electrode 36 are seen from the normal line direction of the light modulation device 30, a section corresponding to a location where the lower electrode 32 and the upper electrode 36 are opposed to each other in the light modulation device 30 constitutes a light modulation cell 30A. The respective light modulation cells 30-1 are able to be driven independently by applying a given voltage to the lower electrode 32 and the upper electrode 36. The respective light modulation cells 30-1 show transparency and show scattering characteristics to light from the light source 20 according to the magnitude of the voltage value applied to the lower electrode 32 and the upper electrode 36. The transparency and the scattering characteristics will be described in detail in explaining the light modulation layer 34.

The alignment films 33 and 35 are intended to align, for example, liquid crystal and a monomer used for the light modulation layer 34. Examples of alignment film type include a vertical alignment film and a horizontal alignment film. In this embodiment, the horizontal alignment film is used for the alignment films 33 and 35. Examples of horizontal alignment film include an alignment film formed by providing rubbing treatment for polyimide, polyamideimide, polyvinyl alcohol or the like and an alignment film to which a groove shape is given by transfer, etching or the like. Further, examples of horizontal alignment film include an alignment film formed by oblique evaporation of an inorganic material such as silicon oxide, a diamond-like carbon alignment film formed by ion beam irradiation, and an alignment film in which an electrode pattern slit is formed. In the case where a plastic film is used as the transparent substrates 31 and 37, in the manufacturing step, it is preferable that firing temperature after coating the surface of the transparent substrates 31 and 37 with the alignment films 33 and 35 is low as much as possible, and thus polyamideimide capable of being formed at temperature of 100 deg C. or less is preferably used as the alignment films 33 and 35.

In both the vertical alignment film and the horizontal alignment film, it is enough that the function to align liquid crystal and a monomer is included, and reliability or the like by repeated voltage application necessary for a general liquid crystal display is not necessarily included for the following reason. That is, reliability by applying a voltage after forming a device is determined by an interface between a polymerized monomer and liquid crystal. Further, even if the alignment film is not used, for example, liquid crystal and a monomer used for the light modulation layer 34 are able to be aligned by applying an electric field and a magnetic field between the lower electrode 32 and the upper electrode 36. That is, alignment state of the liquid crystal and the monomer in a state of voltage application is able to be fixed by irradiating with ultraviolet while applying an electric field and a magnetic field between the lower electrode 32 and the upper electrode 36. In the case where a voltage is used for forming the alignment film, each different electrode is formed for alignment use and for drive use, or bi-frequency liquid crystal or the like in which sign of dielectric constant anisotropy is reversed according to frequency is able to be used as a liquid crystal material. Further, in the case where a magnetic field is used for forming the alignment film, a material having large magnetic susceptibility anisotropy is preferably used as an alignment film, and, for example, a material including many benzene rings is preferably used.

As illustrated in FIG. 1B, for example, the light modulation layer 34 is a composite layer including a bulk 34A (second region) and a plurality of particulate microparticles 34B (first region) dispersed in the bulk 34A. The bulk 34A and the microparticles 34B have optical anisotropy.

Figure 4A:
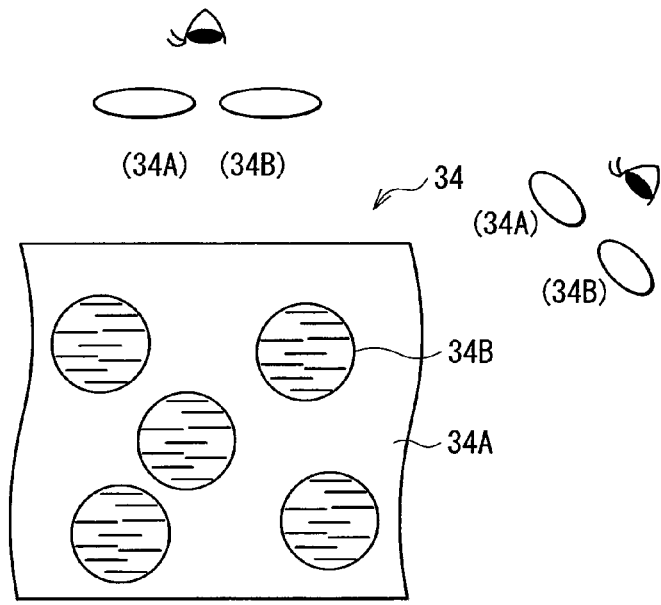
FIGS. 4A to 4C are schematic views for explaining operation of the light modulation device of FIGS. 1A and 1B.
Figure 4B:
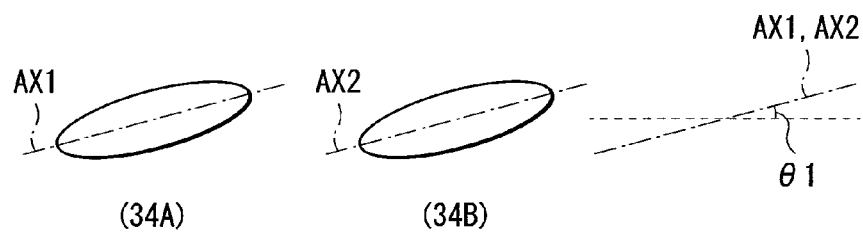
Figure 4C:
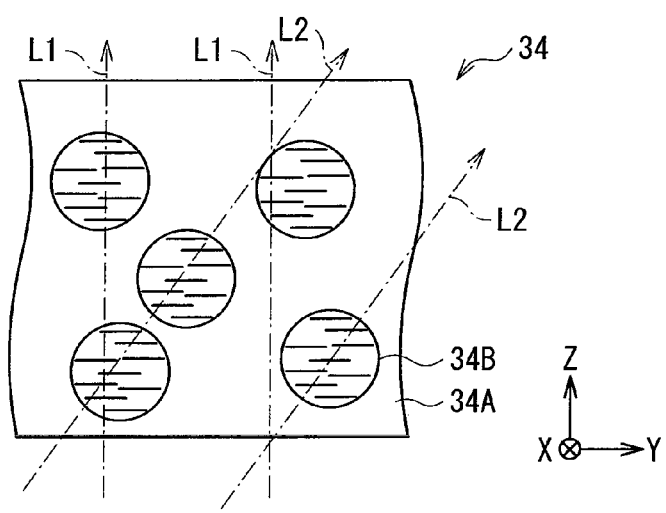

FIG. 4A schematically illustrates an example of alignment state in the microparticles 34B when a voltage is not applied between the lower electrode 32 and the upper electrode 36. In FIG. 4A, description of alignment state in the bulk 34A is omitted. FIG. 4B illustrates an example of an index ellipsoid showing refractive index anisotropy of the bulk 34A and the microparticles 34B when a voltage is not applied between the lower electrode 32 and the upper electrode 36. The index ellipsoid shows refractive index of linear polarized light entering from various directions with the use of a tensor ellipsoid. By viewing a cross section of the ellipsoid from light incident direction, refractive index is able to be known geometrically. FIG. 4C schematically illustrates an example of a state that light L1 heading to the front face direction and light L2 heading to a diagonal direction are transmitted through the light modulation layer 34 when a voltage is not applied between the lower electrode 32 and the upper electrode 36.

Figure 5A:
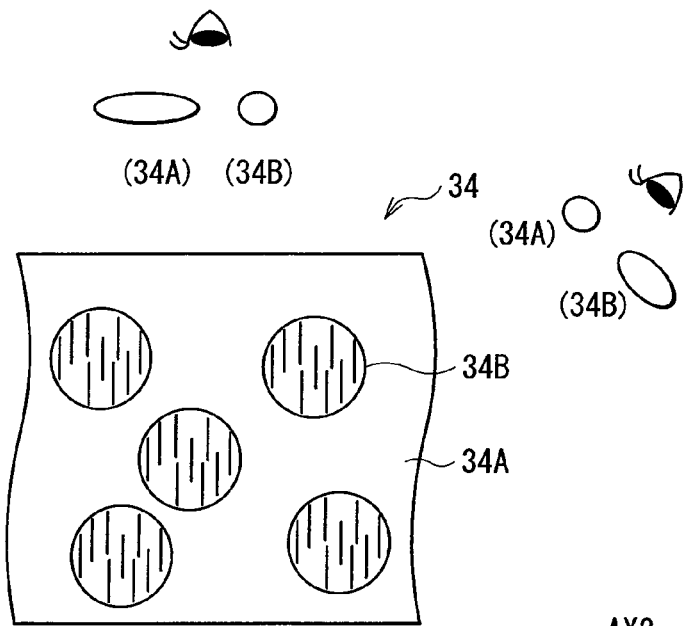
FIGS. 5A to 5C are schematic views for explaining operation of the light modulation device of FIGS. 1A and 1B.
Figure 5B:
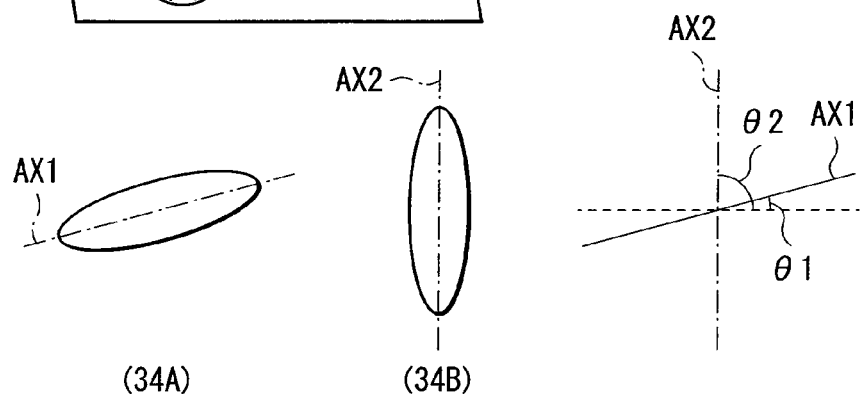
Figure 5C:
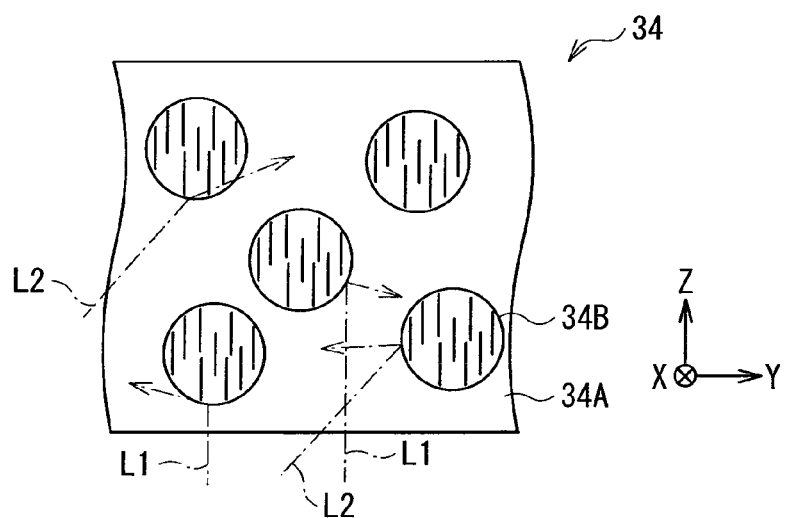

FIG. 5A schematically illustrates an example of alignment state in the microparticles 34B when a voltage is applied between the lower electrode 32 and the upper electrode 36. In FIG. 5A, description of alignment state in the bulk 34A is omitted. FIG. 5B illustrates an example of an index ellipsoid showing refractive index anisotropy of the bulk 34A and the microparticles 34B when a voltage is applied between the lower electrode 32 and the upper electrode 36. FIG. 5C schematically illustrates an example of a state that the light L1 heading to the front face direction and the light L2 heading to a diagonal direction are scattered in the light modulation layer 34 when a voltage is applied between the lower electrode 32 and the upper electrode 36.

For example, as illustrated in FIGS. 4A and 4B, the bulk 34A and the microparticles 34B have a structure that the orientation of an optical axis AX1 of the bulk 34A corresponds with (is in parallel with) the orientation of an optical axis AX2 of the microparticles 34B when a voltage is not applied between the lower electrode 32 and the upper electrode 36. The light axes AX1 and AX2 represent a line in parallel with traveling direction of light ray in which refractive index becomes one value without relation to the polarization direction. Further, the orientations of the light axes AX1 and AX2 may not necessarily correspond with each other, but the orientations of the light axes AX1 and AX2 may be somewhat shifted due to, for example, manufacturing error or the like.

Further, the microparticles 34B have a structure that the optical axis AX2 is in parallel with the light incident face 10A of the light guide plate 10 when a voltage is not applied between the lower electrode 32 and the upper electrode 36. Further, for example, the microparticles 34B have a structure that the optical axis AX2 crosses with the surface of the transparent substrates 31 and 37 at a slight angle θ1 (first angle) when a voltage is not applied between the lower electrode 32 and the upper electrode 36 (see FIG. 4B). For the angle θ1, a description will be given in detail in explaining a material of the microparticles 34B.

Meanwhile, the bulk 34A has a structure that the optical axis AX1 of the bulk 34A is constant without relation to presence of voltage application between the lower electrode 32 and the upper electrode 36. Specifically, for example, as illustrated in FIGS. 4A and 4B and FIGS. 5A and 5B, the bulk 34A has a structure that the optical axis AX1 of the bulk 34A is in parallel with the light incident face 10A of the light guide plate 10, and crosses with the surface of the transparent substrates 31 and 37 at a given angle θ1 (first angle). That is, the optical axis AX1 of the bulk 34A is in parallel with the optical axis AX2 of the microparticles 34B when a voltage is not applied between the lower electrode 32 and the upper electrode 36.

The optical axis AX2 may not be necessarily in parallel with the light incident face 10A of the light guide plate 10, and may not be necessarily cross with the surface of the transparent substrates 31 and 37 at the angle θ1. For example, due to manufacturing error or the like, the optical axis AX2 may cross with the surface of the transparent substrates 31 and 37 at an angle slightly different from the angle θ1. Further, the light axes AX1 and AX2 may not be necessarily in parallel with the light incident face 10A of the light guide plate 10. For example, due to manufacturing error or the like, the light axes AX1 and AX2 may cross with the light incident face 10A of the light guide plate 10 at a small angle.

Figure 6:
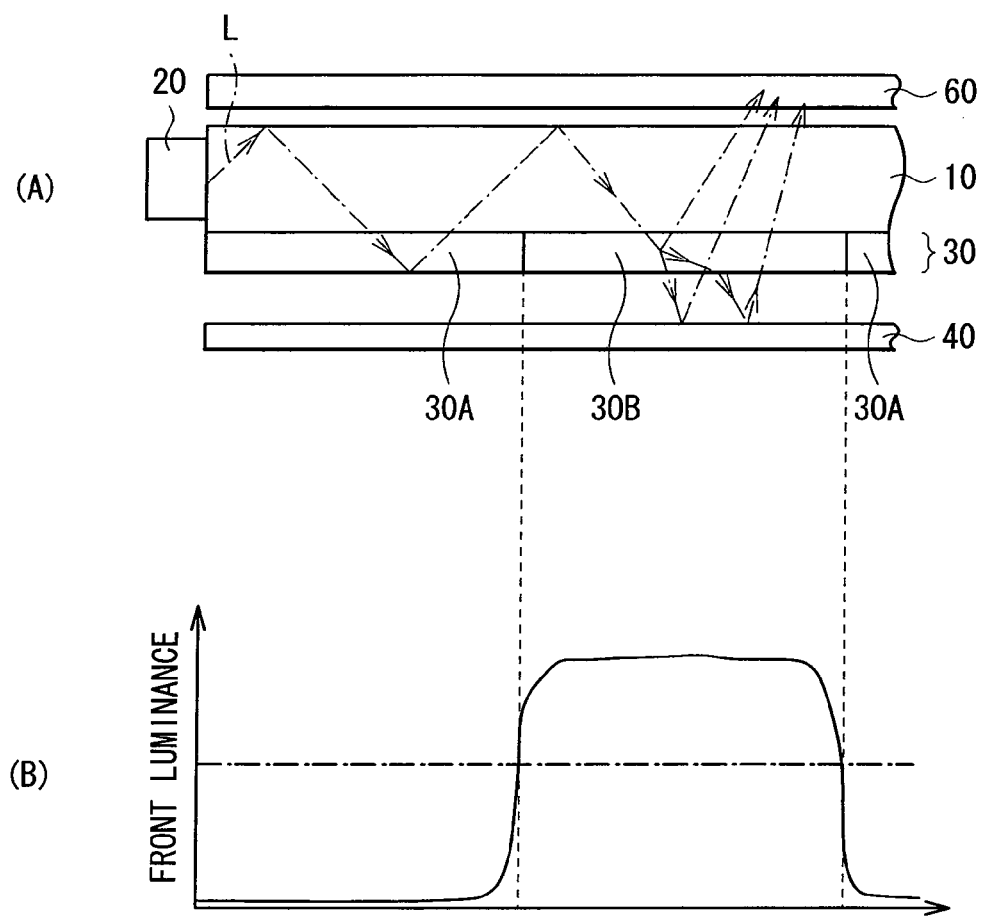
FIG. 6 is a schematic view for explaining operation of the backlight of FIG. 1A.

It is preferable that ordinary light refractive index of the bulk 34A is equal to ordinary light refractive index of the microparticles 34B, and extraordinary light refractive index of the bulk 34A is equal to extraordinary light refractive index of the microparticles 34B. In this case, for example, when a voltage is not applied between the lower electrode 32 and the upper electrode 36, as illustrated in FIG. 4A, refractive index difference hardly exists in all directions including the front face direction and diagonal directions, and high transparency is able to be obtained. Thereby, for example, as illustrated in FIG. 4C, the light L1 heading to the front face direction and the light L2 heading to a diagonal direction are transmitted through the light modulation layer 34 without being scattered in the light modulation layer 34. In the result, for example, as illustrated in FIG. 6, the light L from the light source 20 (light from a diagonal direction) is totally reflected by the interface of a transparent region 30A (interface between the transparent substrate 31/light guide plate 10 and air), and luminance of the transparent region 30A (luminance of black display) becomes lower than that in the case that the light modulation device 30 is not provided (dashed line in (B) in FIG. 6).

Further, for example, as illustrated in FIG. 5A, the bulk 34A and the microparticles 34B have a structure that the orientation of the optical axis AX1 is different from (crosses with) the orientation of the optical axis AX2 when a voltage is applied between the lower electrode 32 and the upper electrode 36. Further, the microparticles 34B have a structure that the optical axis AX2 of the microparticles 34B is in parallel with the light incident face 10A of the light guide plate 10 and crosses with the surface of the transparent substrates 31 and 37 at an angle θ2 (second angle) (for example, 90 degrees) larger than the angle θ1 when a voltage is applied between the lower electrode 32 and the upper electrode 36. For the angle θ2, a description will be given in detail in explaining a material of the microparticles 34B.

When a voltage is applied between the lower electrode 32 and the upper electrode 36, in the light modulation layer 34, refractive index difference becomes large in all directions including the front face direction and diagonal directions, and high scattering characteristics are able to be obtained. Thereby, for example, as illustrated in FIG. 5C, the light L1 heading to the front face direction and the light L2 heading to a diagonal direction are scattered in the light modulation layer 34. In the result, for example, as illustrated in FIG. 6, the light L from the light source 20 (light from a diagonal direction) is transmitted through the interface of a scattering region 30B (interface between the transparent substrate 31/the light guide plate 10 and air), and light transmitted to the reflective plate 40 side is reflected by the reflective plate 40 and is transmitted through the light modulation device 30. Thus, luminance of the scattering region 30B becomes significantly higher than that in the case that the light modulation device 30 is not provided (dashed line in (B) in FIG. 6), and partial white display luminance (luminance rise) is increased by the decreased portion of luminance of the transparent region 30A.

The ordinary light refractive index of the bulk 34A and the ordinary light refractive index of the microparticles 34B may be somewhat shifted due to manufacturing error or the like, for example, are preferably 0.1 or less, and are more preferably 0.05 or less. Further, the extraordinary light refractive index of the bulk 34A and the extraordinary light refractive index of the microparticles 34B may be somewhat shifted due to manufacturing error or the like, for example, is preferably 0.1 or less, and is more preferably 0.05 or less.

Further, refractive index difference of the bulk 34A (Δn0=extraordinary light refractive index n1−ordinary light refractive index n0) and refractive index difference of the microparticles 34B (Δn1=extraordinary light refractive index n3−ordinary light refractive index n2) are preferably as large as possible, are preferably 0.05 or more, are more preferably 0.1 or more, and are much more preferably 0.15 or more. In the case where the refractive index difference of the bulk 34A and the microparticles 34B is large, scattering ability of the light modulation layer 34 becomes high, light guide conditions are able to be easily destroyed, and light from the light guide plate 10 is easily extracted.

Further, response speed to an electric field of the bulk 34A is different from that of the microparticles 34B. The bulk 34A has a linear structure or a porous structure that does not respond to an electric field, or a bar-like structure having response speed slower than response speed of the microparticles 34B. The bulk 34A is made of a polymer material obtained by polymerizing a low molecular monomer, for example. The bulk 34A is formed by polymerizing a material having alignment characteristics and polymerizable characteristics (for example, a monomer) that is, for example, aligned along the alignment direction of the microparticles 34B or the alignment direction of the alignment films 33 and 35 by at least one of heat and light. The linear structure, the porous structure, or the bar-like structure of the bulk 34A has a long axis in the direction that is in parallel with the light incident face 10A of the light guide plate 10 and that crosses with the surface of the transparent substrates 31 and 37 at the slight angle θ1. In the case where the bulk 34A has the linear structure, an average linear texture size in the short axis direction is preferably from 0.1 μm to 10 μm both inclusive, and is more preferably from 0.2 μm to 2.0 μm both inclusive in terms of improving scattering characteristics of guided light. Further, the average linear texture size in the short axis direction is preferably from 0.5 μm to 5 μm both inclusive, and is more preferably from 1 μm to 3 μm both inclusive in terms of decreasing wavelength dependence of scattering. The linear texture size is able to be observed by a polarization microscope, a confocal microscope, an electron microscope or the like.

Meanwhile, the microparticles 34B mainly contain, for example, a liquid crystal material, and has more sufficiently high response speed than response speed of the bulk 34A. The liquid crystal material (liquid crystal molecule) contained in the microparticles 34B is, for example, a rod-like molecule. As the liquid crystal molecule contained in the microparticles 34B, a liquid crystal molecule having positive dielectric constant anisotropy (so-called positive liquid crystal) is preferably used.

When a voltage is not applied between the lower electrode 32 and the upper electrode 36, in the microparticles 34B, the long axis direction of the liquid crystal molecule is in parallel with the optical axis AX2. At this time, the long axis of the liquid crystal molecule in the microparticles 34B is in parallel with the light incident face 10A of the light guide plate 10, and crosses with the surface of the transparent substrates 31 and 37 at the slight angle θ1. That is, when a voltage is not applied between the lower electrode 32 and the upper electrode 36, the liquid crystal molecule in the microparticles 34B is aligned being tilted by the angle θ1 in the plane in parallel with the light incident face 10A of the light guide plate 10. The angle θ1 is called pretilt angle, and is preferably from 0.1 degrees to 30 degrees both inclusive, for example. The angle θ1 is more preferably from 0.5 degrees to 10 degrees both inclusive, and much more preferably from 0.7 degrees to 2 degrees both inclusive. If the angle θ1 is increased, scattering efficiency tends to be decreased for the reason described later. Further, if the angle θ1 is excessively decreased, liquid crystal rising azimuthal angle at the time of applying a voltage varies. For example, in some cases, the liquid crystal rises in orientation on the opposite side by 180 degrees (reverse tilt). Thereby, refractive index difference between the microparticles 34B and the bulk 34A is not effectively used, and thus scattering efficiency tends to be decreased and luminance tends to be decreased.

Further, when a voltage is applied between the lower electrode 32 and the upper electrode 36, in the microparticles 34B, the long axis direction of the liquid crystal molecule crosses with (or is orthogonal to) the optical axis AX2. At this time, the long axis of the liquid crystal molecule in the microparticles 34B is in parallel with the light incident face 10A of the light guide plate 10, and crosses with the surface of the transparent substrates 31 and 37 at the angle θ2 larger than the angle θ1 (for example, 90 degrees). That is, when a voltage is applied between the lower electrode 32 and the upper electrode 36, the liquid crystal molecule in the microparticles 34B is aligned being tilted by the angle θ2 or directly standing at the angle θ2 (=90 degrees) in the plane in parallel with the light incident face 10A of the light guide plate 10.

As the foregoing monomer having alignment characteristics and polymerizable characteristics, a material that has optical anisotropy and that forms a composite material together with liquid crystal may be used. However, in this embodiment, a low molecular monomer that is cured by ultraviolet is preferable. It is preferable that in a state that a voltage is not applied, optical anisotropy direction of liquid crystal corresponds with that of a material (polymer material) formed by polymerizing a low molecular monomer. Thus, it is preferable that the liquid crystal and the low molecular monomer are aligned in the same direction before ultraviolet curing. In the case where liquid crystal is used as the microparticles 34B and the liquid crystal is a rod-like molecule, the shape of a monomer material to be used is preferably rod-like as well. Accordingly, as the monomer material, a material having both polymerizable characteristics and crystallinity is preferably used. For example, the material preferably has at least one functional group selected from the group consisting of an acrylate group, a methacrylate group, an acryloyloxy group, a methacryloyloxy group, a vinylether group, and an epoxy group as a polymerizable functional group. The functional groups are able to be polymerized by irradiating with ultraviolet, infrared, or an electron ray or heating. To inhibit lowering of alignment level in irradiating with ultraviolet, a liquid crystalline material having a multifunctional group is able to be added. In the case where the bulk 34A has the foregoing linear structure, as a raw material of the bulk 34A, bifunctional liquid crystalline monomer is preferably used. Further, it is possible that a monofunctional monomer is added to the raw material of the bulk 34A for the purpose of adjusting temperature showing liquid crystallinity, or a tri (or more) functional monomer is added to the raw material of the bulk 34A for the purpose of improving crosslink density.

The drive circuit 50 controls magnitude of a voltage applied to the pair of electrodes (the lower electrode 32 and the upper electrode 36) of respective light modulation cells 30B so that the optical axis AX2 of the microparticles 34B is in parallel with or almost in parallel with the optical axis AX1 of the bulk 34A in one light modulation cell 30A, and the optical axis AX2 of the microparticles 34B crosses with or is orthogonal to the optical axis AX1 of the bulk 34A in another light modulation cell 30B. That is, the drive circuit 50 is able to execute electric field control so that the orientation of the optical axis AX1 of the bulk 34A corresponds with (or almost corresponds with) the orientation of the optical axis AX2 of the microparticles 34B, or the orientation of the optical axis AX1 of the bulk 34A is different from (or is orthogonal to) the orientation of the optical axis AX2 of the microparticles 34B.

A description will be hereinafter given of a method of manufacturing the backlight 1 of this embodiment with reference to FIGS. 7A to 7C to FIGS. 9A to 9C.

Figure 7A:
FIGS. 7A to 7C are cross sectional views for explaining a step of manufacturing the backlight of FIG. 1A.
Figure 7B:
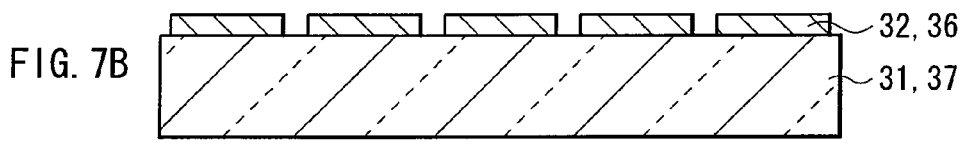

First, transparent conducive films 32-1 and 36-1 made of ITO or the like are formed on the transparent substrates 31 and 37 made of a glass substrate or a plastic film substrate (FIG. 7A). Next, a resist layer is formed on the whole surface. After that, an electrode pattern (the lower electrode 32 and the upper electrode 36) is formed on the resist layer by patterning (FIG. 7B).

As a patterning method, for example, photolithography method, laser processing method, pattern printing method, screen printing method or the like is able to be used. Further, for example, it is possible that screen printing is made by using "hyper etching" material produced by Merck Co., given heating is made, and the resultant is subsequently washed with water to perform patterning. The electrode pattern is determined by driving method and the division number of partial drive. For example, in the case where a 42 inch display is divided into 12 by 6, a pattern is made so that the electrode width is about 80 mm, and a slit between electrodes is as small as possible. However, an excessively small slit does not work much due to after-mentioned gradation characteristics. Thus, specifically, the slit size is preferably about from 10 to 500 μm both inclusive. Further, it is possible that ITO nano particles are pattern-printed and subsequently fired, and thereby the electrode pattern is formed.

Figure 7C:
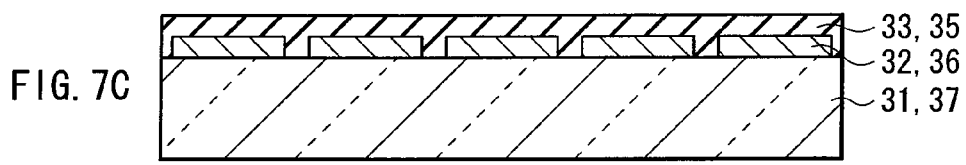

Next, after the whole surface is coated with the alignment films 33 and 35, the resultant is dried and fired (FIG. 7C). In the case where a polyimide material is used as the alignment films 33 and 35, NMP (N-methyl-2-pyrrolidone) is often used as a solvent. In this case, temperature about 200 deg C. is necessitated under atmosphere. In this case, in the case where a plastic substrate is used as the transparent substrates 31 and 37, it is possible that the alignment films 33 and 35 are able to vacuum-dried and fired at 100 deg C. After that, rubbing treatment is performed for the alignment films 33 and 35. Thereby, the alignment films 33 and 35 function as an alignment film for horizontal alignment. In addition, pretilt is able to be formed in the rubbing direction of the alignment films 33 and 35.

Figure 8A:
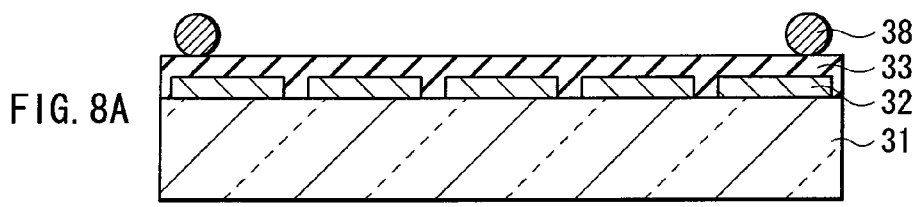
FIGS. 8A to 8C are cross sectional views for explaining a manufacturing step following FIGS. 7A to 7C.

Next, a spacer 38 for forming a cell gap is dry-scattered or wet-scattered on the alignment film 33 (FIG. 8A). In the case where the light modulation cell 30A is formed by vacuum lamination method, the spacer 38 may be mixed in a mixture to be dropped. Further, instead of the spacer 38, a column spacer is able to be formed by photolithography method.

Figure 8B:
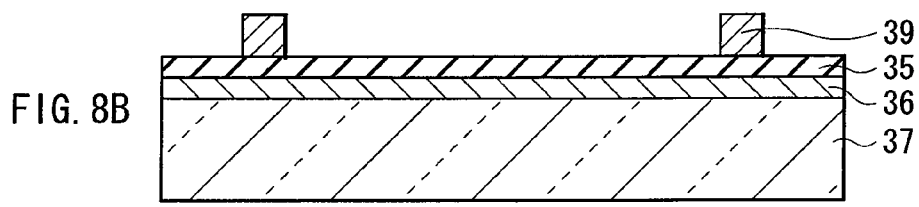

Subsequently, the alignment film 35 is coated with a sealing agent pattern 39 for sealing and preventing liquid crystal leakage in a frame state, for example (FIG. 8B). The sealing agent pattern 39 is able to be formed by dispenser method and screen printing method.

A description will be given of the vacuum lamination method (One Drop Fill method: ODF method). However, the light modulation cell 30A is able to be formed by vacuum injection method, roll lamination method or the like.

Figure 8C:
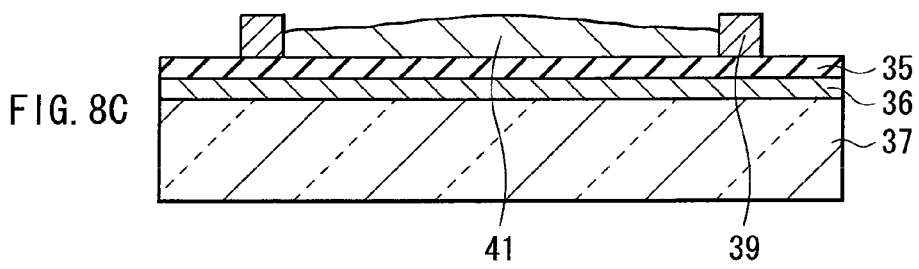

First, a mixture 41 composed of liquid crystal and a monomer for a cubic volume determined by a cell gap, a cell area or the like is uniformly dropped in the plane (FIG. 8C). Though the mixture 41 is preferably dropped by using a linear guide precise dispenser, a die coater or the like may be used with the use of the sealing agent pattern 39 as a bank.

For the liquid crystal and the monomer, the foregoing material may be used. The weight ratio between the liquid crystal and the monomer is from 98:2 to 50:50, is preferably 95:5 to 75:25, and is more preferably 92:8 to 85:15. By increasing the ratio of the liquid crystal, a drive voltage is able to be decreased. However, if the ratio of the liquid crystal is difficult to be increased, there is a tendency that a state is hardly returned to the state at the time of transparency, for example, white level at the time of voltage application is decreased, or response speed after turning off the voltage is lowered.

The mixture 41 is added with a polymerization initiator in addition to the liquid crystal and the monomer. According to the ultraviolet wavelength to be used, the monomer ratio of the added polymerization initiator is adjusted in the range from 0.1 to 10 wt %. In addition, the mixture 41 may be added with a polymerization inhibitor, a plasticizer, a viscosity adjustment agent or the like according to needs. In the case where the monomer is in a state of solid or gel at room temperature, a cap, a syringe, and a substrate are preferably heated.

Figure 9A:
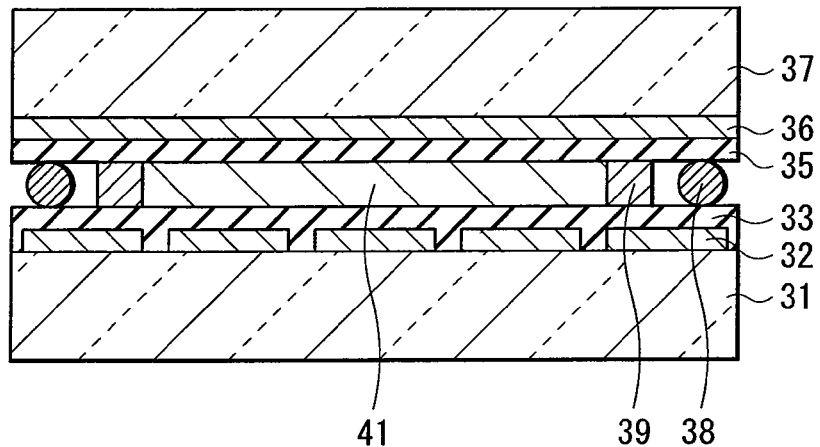
FIGS. 9A to 9C are cross sectional views for explaining a manufacturing step following FIGS. 8A to 8C.

After the transparent substrate 31 and the transparent substrate 37 are arranged in a vacuum laminator (not illustrated), vacuum evacuation is made and lamination is performed (FIG. 9A). After that, the laminated resultant is released out into the air and the cell gap is uniformly pressurized under air pressure. The cell gap is able to be selected as appropriate according to relation between white luminance (white level) and a drive voltage. The cell gap size is from 5 to 40 μm both inclusive, is preferably from 6 to 20 μm both inclusive, and more preferably from 7 to 10 μm both inclusive.

Figure 9B:
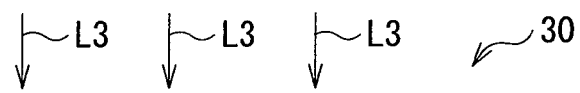
Figure 9B:
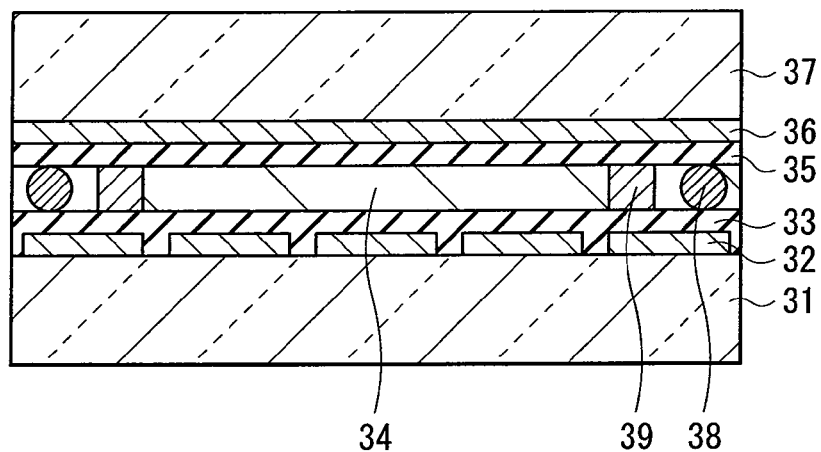
Figure 9C:
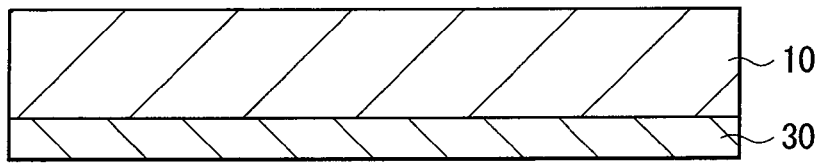

After lamination, alignment process is preferably performed according to needs (not illustrated). In the case where light leakage is generated when the laminated cell is inserted between crossed nicol light polarizers, the cell is provided with heating treatment for a certain time or is left at room temperature to perform alignment. After that, ultraviolet L3 is irradiated to polymerize the monomer (FIG. 9B). Accordingly, the light modulation device 30 is manufactured.

During ultraviolet irradiation, cell temperature is preferably unchanged. An infrared cut filter is preferably used, or a UV-LED or the like is preferably used as a light source. Ultraviolet illumination affects a texture structure of the composite material. Thus, the ultraviolet illumination is preferably adjusted as appropriate according to the used liquid crystal material, the used monomer material, and the composition thereof. The ultraviolet illumination is preferably from 0.1 to 500 mW/cm2 both inclusive, and is more preferably from 0.5 to 30 mW/cm2 both inclusive. As the ultraviolet illumination is lower, a drive voltage tends to be lower. Favorable ultraviolet illumination is able to be selected in terms of both productivity and characteristics.

After that, the light modulation device 30 is bonded to the light guide plate 10. The light modulation device 30 may be bonded to the light guide plate 10 by sticking or adhesion. Sticking or adhesion is preferably made with the use of a material having refractive index that is close to the refractive index of the light guide plate 10 and the refractive index of the substrate material of the light modulation device 30 as much as possible. Finally, a leading line (not illustrated) is attached to the lower electrode 32 and the upper electrode 36. Accordingly, the backlight 1 of this embodiment is manufactured.

The description has been hereinbefore given of the process in which the light modulation device 30 is formed and finally the light modulation device 30 is bonded to the light guide plate 10. However, the backlight 1 is able to be formed after the transparent substrate 37 provided with the alignment film 35 is previously bonded to the surface of the light guide plate 10. Further, the backlight 1 is able to be formed by sheet method or roll-to-roll method.

Next, a description will be given of operation and effect of the backlight 1 of this embodiment.

In the backlight 1 of this embodiment, for example, a voltage is applied to the pair of electrodes (the lower electrode 32 and the upper electrode 36) of the respective light modulation cells 30-1 so that the optical axis AX2 of the microparticles 34B is in parallel with or almost in parallel with the optical axis AX1 of the bulk 34A in the light modulation cell 30A, and the optical axis AX2 of the microparticles 34B crosses with or is orthogonal to the optical axis AX1 of the bulk 34A in the light modulation cell 30-1. Thereby, light that is outputted from the light source 20 and enters into the light guide plate 10 is transmitted through the transmission region 30A in which the optical axis AX1 and the optical axis AX2 are in parallel with or almost in parallel with each other in the light modulation device 30. Meanwhile, light that is outputted from the light source 20 and enters into the light guide plate 10 is scattered in the scattering region 30B in which the optical axis AX1 and the optical axis AX2 cross with each other or are perpendicular to each other in the light modulation device 30. Out of the scattered light, light transmitted through the lower face of the scattering region 30B is reflected by the reflective plate 40, and is returned to the light guide plate 10 again. After that, the light is outputted from the upper face of the backlight 1. Further, out of the scattered light, light heading to the upper face of the scattering region 30B is transmitted through the light guide plate 10, and is subsequently outputted from the upper face of the backlight 1. As described above, in this embodiment, light is hardly outputted from the upper face of the transmission region 30A, and light is outputted from the upper face of the scattering region 30B. Thereby, modulation ratio in the front face direction is increased.

In general, the PDLC is formed by mixing a liquid crystal material and an isotropic low molecular material, and generating phase separation by ultraviolet irradiation, drying of a solvent or the like, and is a composite layer in which microparticles of the liquid crystal material are dispersed in a polymer material. The liquid crystal material in the composite layer is oriented in a random orientation when a voltage is not applied and thus shows scattering characteristics. Meanwhile, when a voltage is applied, the liquid crystal material in the composite layer is aligned in the electric field direction. Thus, in the case where ordinary light refractive index of the liquid crystal material is equal to refractive index of the polymer material, high transparency is shown in the front face direction (normal line direction of the PDLC). However, in the liquid crystal material, difference between extraordinary light refractive index of the liquid crystal material and refractive index of the polymer material is significant in a diagonal direction. Thus, even if transparency is shown in the front face direction, scattering characteristics are expressed in a diagonal direction.

In general, it is often the case that a light modulation device using the PDLC has a structure in which the PDLC is sandwiched between two glass plates on which a transparent conductive film is formed. In the case where light enters diagonally through the air to the light modulation device having the foregoing structure, the light entering from the diagonal direction is refracted due to the refractive index difference between the air and the glass plate, and enters the PDLC at a smaller angle. Thus, in such a light modulation device, no large scattering is generated. For example, in the case where light enters at an angle of 80 degrees through the air, the incident angle of the light to the PDLC is decreased down to about 40 degrees by refraction at the glass interface.

However, in the edge light system using a light guide plate, light enters through the light guide plate. Thus, the light crosses through the PDLC at a large angle about 80 degrees. Thus, difference between extraordinary light refractive index of the liquid crystal material and refractive index of the polymer material is large, and the light crosses through the PDLC at a larger angle, and thus light path subject to scattering becomes longer. For example, in the case where microparticles of a liquid crystal material having ordinary light refractive index of 1.5 and extraordinary light refractive index of 1.65 are dispersed in the polymer material having refractive index of 1.5, no refractive index difference exists in the front face direction (normal line direction of the PDLC), but refractive index difference becomes larger in a diagonal direction. Thus, since scattering characteristics in a diagonal direction are not able to be decreased, view angle characteristics are not favorable. Further, in the case where an optical film such as a diffusion film is provided on the light guide plate, diagonally leaked light is diffused in the front face direction as well by a diffusion film or the like. Thus, light leakage in the front face direction is increased, and the modulation ratio in the front face direction is decreased.

Meanwhile, in this embodiment, the bulk 34A and the microparticles 34B mainly contain an optical anisotropic material. Thus, in a diagonal direction, scattering characteristics are decreased and transparency is able to be improved. For example, in a region where the bulk 34A mainly contain an optical anisotropic material with ordinary light refractive index and extraordinary light refractive index equal to those of an optical anisotropic material of the microparticles 34B and where a voltage is not applied between the lower electrode 32 and the upper electrode 36, orientations of their light axes correspond with or almost correspond with each other. Thereby, refractive index difference in all directions including the front face direction (normal line direction of the light modulation device 30) and diagonal directions is decreased or eliminated, and high transparency is able to be obtained. In the result, light leakage in the region of large view angle is able to be decreased or almost eliminated, and view angle characteristics are able to be improved.

For example, in the case where liquid crystal having ordinary light refractive index of 1.5 and extraordinary light refractive index of 1.65 and a liquid crystalline monomer having ordinary light refractive index of 1.5 and extraordinary light refractive index of 1.65 are mixed, and the liquid crystalline monomer is polymerized in a state that the liquid crystal and the liquid crystalline monomer are aligned by an alignment film or an electric field, optical axis of the liquid crystal corresponds with optical axis of a polymer formed by polymerizing the liquid crystalline monomer. Thereby, refractive index is able to be identical in all directions. Thus, in this case, high transparency state is able to be realized, and view angle characteristics are able to be further improved.

Further, in this embodiment, for example, as illustrated in FIG. 6, luminance of the transparent region 30A (luminance of black display) is lower than that in the case that the light modulation device 30 is not provided (dashed line in (B) in FIG. 6). Meanwhile, luminance of the scattering region 30B is significantly higher than that in the case that the light modulation device 30 is not provided (dashed line in (B) in FIG. 6), and partial white display luminance (luminance rise) is increased by the decreased portion of luminance of the transparent region 30A.

The luminance rise is a technique for improving luminance in the case where white display is partially made compared to a case that white display is made on the whole screen. In general, such a technique is often used in a CRT, a PDP or the like. However, in the liquid crystal display, the backlight uniformly and wholly generates light without relation to any image, and thus luminance is not able to be increased partially. However, in the case where the backlight is composed of an LED backlight in which a plurality of LEDs are two dimensionally arranged, the LEDs are able to be partially turned off. However, in this case, diffused light from a dark region where the LED is turned off does not exist. Thus, compared to a case that all LEDs are turned on, luminance is decreased. Further, by increasing a current applied to the LEDs that are partially turned on, luminance is able to be increased. However, in this case, since a large current is applied for a significantly short time, there is a disadvantage in terms of load and reliability of a circuit.

Meanwhile, in this embodiment, the bulk 34A and the microparticles 34B mainly contain the optical anisotropic material. Thus, scattering characteristics in a diagonal direction are inhibited, and leaked light from the light guide plate in dark state is little. Thereby, light guide is performed from a partially dark state section to a partially light state section. Thus, luminance rise is able to be realized without increasing input electric power to the backlight 1.

Further, in this embodiment, the optical axis AX2 of the microparticles 34B is in parallel with the light incident face 10A of the light guide plate 10, and crosses with the surface of the transparent substrates 31 and 37 at a slight angle $\theta 1$ in a region where a voltage is not applied between the lower electrode 32 and the upper electrode 36. That is, the liquid crystal molecule contained in the microparticles 34B is aligned being tilted by the angle $\theta 1$ in the plane in parallel with the light incident face 10A (pretilt angle is given). Thus, when a voltage is applied between the lower electrode 32 and the upper electrode 36, the liquid crystal material contained in the microparticles 34B does not rise in a random orientation, but rises in the plane in parallel with the light incident face 10A. At this time, the light axes AX1 and AX2 of the bulk 34A and the microparticles 34B cross with each other or are perpendicular to each other in the plane in parallel with the light incident face 10A. In this case, in light entering from the light incident face 10A of the light guide plate 10, light oscillating perpendicular to the transparent substrate 31 senses difference between extraordinary light refractive index of the microparticles 34B and ordinary light refractive index of the bulk 34A. At this time, since the difference between extraordinary light refractive index of the microparticles 34B and ordinary light refractive index of the bulk 34A is large, scattering efficiency of the light oscillating perpendicular to the transparent substrate 31 is increased. Meanwhile, light oscillating in parallel with the transparent substrate 31 senses difference between ordinary light refractive index of the microparticles 34B and extraordinary light refractive index of the bulk 34A. At this time, since the difference between ordinary light refractive index of the microparticles 34B and extraordinary light refractive index of the bulk 34A is large, scattering efficiency of the light oscillating in parallel with the transparent substrate 31 is increased as well. Thus, light propagating in a region where a voltage is applied between the lower electrode 32 and the upper electrode 36 includes many components in a diagonal direction. For example, in the case where an acryl light guide plate is used as the light guide plate 10, light in a region where a voltage is applied between the lower electrode 32 and the upper electrode 36 propagates at an angle of 41.8 degrees or more. As a result, refractive index difference is increased in all directions including a diagonal direction, and high scattering characteristics are able to be obtained, and accordingly display luminance is able to be improved. Further, due to effect of the foregoing luminance rise, display luminance is able to be further improved.

For example, in the case where the light axes AX 1 and AX2 of the bulk 34A and the microparticles 34B are arranged perpendicular to the light incident face 10A of the light guide plate 10 when a voltage is not applied, and in the case where the liquid crystal material contained in the microparticles 34B rises in the plane perpendicular to the light incident face 10A when a voltage is applied between the lower electrode 32 and the upper electrode 36, light oscillating perpendicular to the transparent substrate 31 senses difference between extraordinary light refractive index of the microparticles 34B and ordinary light refractive index of the bulk 34A, while light oscillating in parallel with the transparent substrate 31 senses difference between ordinary light refractive index of the microparticles 34B and ordinary light refractive index of the bulk 34A. The difference between ordinary light refractive index of the microparticles 34B and ordinary light refractive index of the bulk 34A hardly exists, or does not exist at all. Thus, in light entering from the light incident face 10A, the light oscillating perpendicular to the transparent substrate 31 senses large refractive index difference as in the foregoing case, while the light oscillating in parallel with the transparent substrate 31 hardly senses refractive index difference or does not sense refractive index difference at all. As a result, scattering efficiency of light oscillating perpendicular to the transparent substrate 31 becomes high, while scattering efficiency of light oscillating in parallel with the transparent substrate 31 is low or zero. Thus, in the case where the light axes AX 1 and AX2 are arranged perpendicular to the light incident face 10A, scattering efficiency is lower than that in the case that the light axes AX 1 and AX2 are arranged in parallel with the light incident face 10A, and therefore luminance extracted from the light guide plate 10 is lower than that of the light modulation device 30 of this embodiment.

Accordingly, in this embodiment, display luminance is able to be improved while light leakage in a range of high view angle is decreased or is almost eliminated. In the result, modulation ratio in the front face direction is able to be increased.

Second Embodiment

Next, a description will be given of a backlight according to a second embodiment. The structure of the backlight of this embodiment is different from the structure of the backlight 1 of the foregoing embodiment in that a vertical alignment film is used as the alignment films 33 and 35 and a light modulation layer 64 is provided instead of the light modulation layer 34 of the foregoing embodiment. Thus, a description will be given mainly of points different from the structure of the foregoing embodiment, and description of points common to those of the structure of the foregoing embodiment will be omitted as appropriate.

As described above, in this embodiment, the vertical alignment film is used as the alignment films 33 and 35. By the vertical alignment film, in a bulk 64A and microparticles 64B described later, alignment tilted from the transparent substrate 31 (pretilt) is formed. As the vertical alignment film, a silane coupling material, polyvinyl alcohol (PVA), a polyimide material, an interfacial active agent or the like may be used. For example, by performing rubbing treatment after coating and drying of these materials, the pretilt is formed in the rubbing direction. Further, in the case where a plastic film is used as the transparent substrates 31 and 37, in the manufacturing step, firing temperature after coating the surface of the transparent substrates 31 and 37 with the alignment films 33 and 35 is preferably as low as possible. Thus, in this case, the silane coupling material with which alcohol solvent is able to be used is preferably used as the alignment films 33 and 35. It is possible that pretilt is formed without providing rubbing treatment for the alignment films 33 and 35. Example of a method to realize the pretilt as above include a method in which a cell is formed in the alignment films 33 and 35, and the cell is irradiated with ultraviolet while applying a magnetic field or an oblique electric field by a slit electrode to the cell.

However, in using the vertical alignment film as the alignment films 33 and 35, as a liquid crystal molecule contained in the microparticles 34B, molecule having negative dielectric constant anisotropy (so-called negative liquid crystal) is preferably used.

Next, a description will be given of the light modulation layer 64 of this embodiment. The light modulation layer 64 is a composite layer containing a bulk 64A (fourth region) and a plurality of particulate microparticles 64B (third region) dispersed in the bulk 64A. The bulk 64A and the microparticles 64B have optical anisotropy.

Figure 10A:
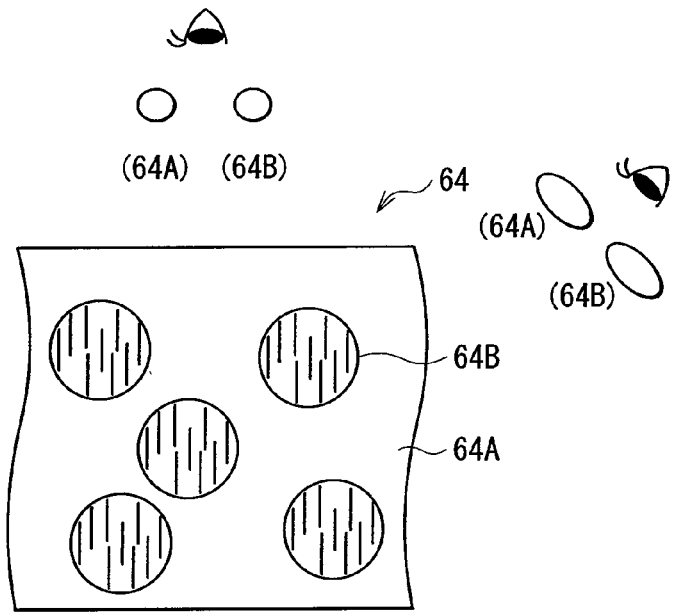
FIGS. 10A to 10C are schematic views for explaining operation of a light modulation device mounted on a backlight according to a second embodiment.
Figure 10B:
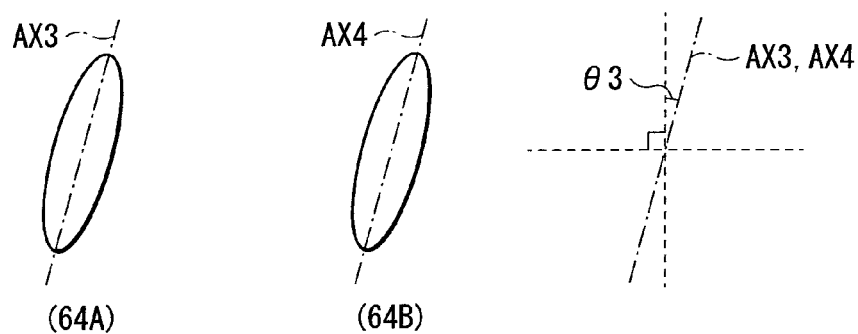
Figure 10C:
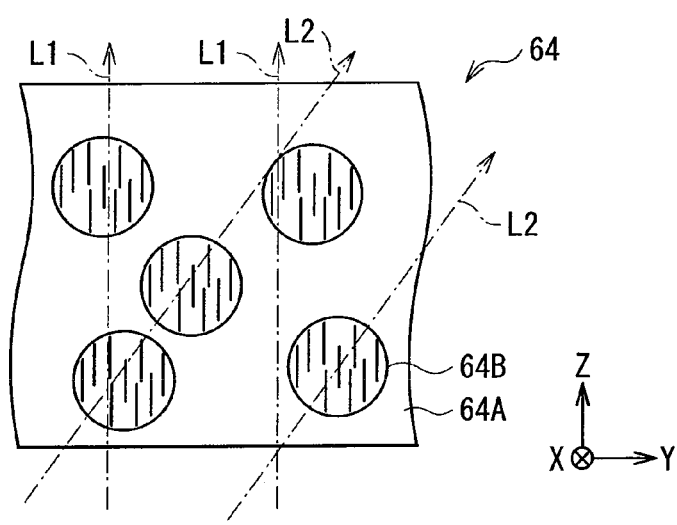

FIG. 10A schematically illustrates an example of alignment state in the microparticles 64B when a voltage is not applied between the lower electrode 32 and the upper electrode 36. In FIG. 10A, illustration of alignment state in the bulk 64A is omitted. FIG. 10B illustrates an example of an index ellipsoid showing refractive index anisotropy of the bulk 64A and the microparticles 64B when a voltage is not applied between the lower electrode 32 and the upper electrode 36. FIG. 10C schematically illustrates an example of a state that the light L1 heading to the front face direction and the light L2 heading to a diagonal direction are transmitted through the light modulation layer 64 when a voltage is not applied between the lower electrode 32 and the upper electrode 36.

Figure 11A:
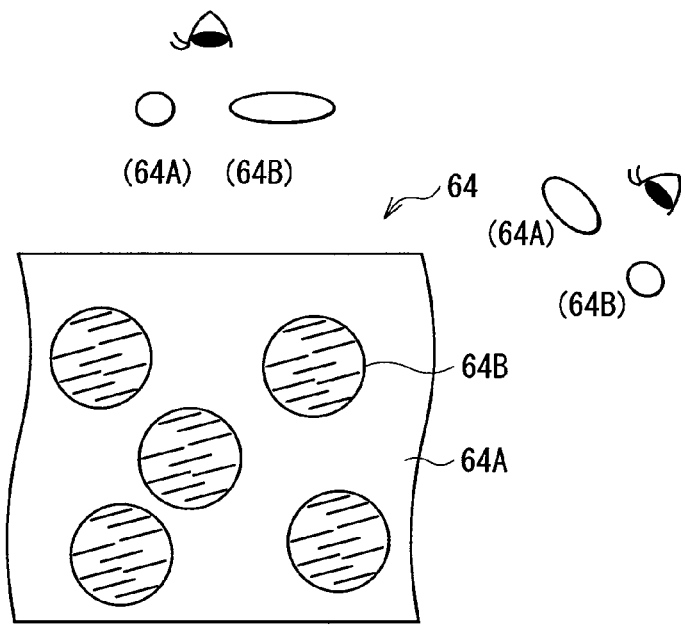
FIGS. 11A to 11C are schematic views for explaining operation of the light modulation device of FIGS. 10A to 10C.
Figure 11B:
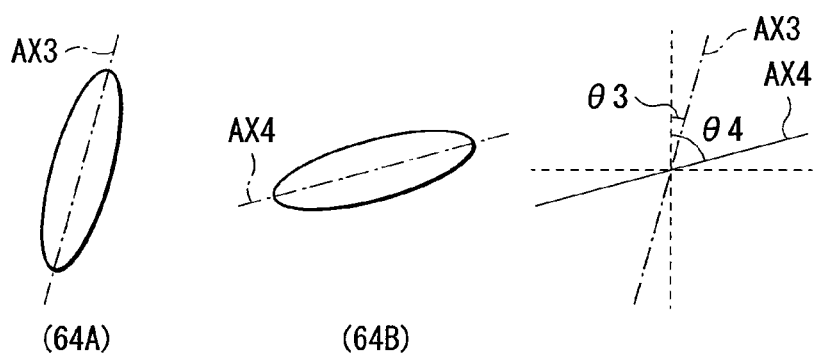
Figure 11C:
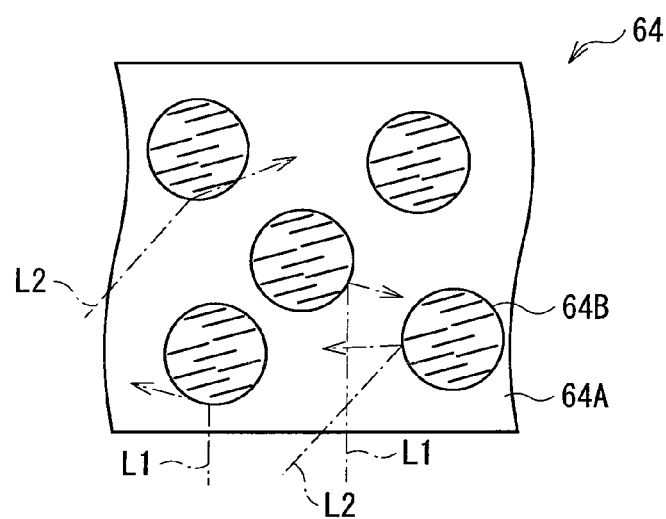

FIG. 11A schematically illustrates an example of alignment state in the microparticles 64B when a voltage is applied between the lower electrode 32 and the upper electrode 36. In FIG. 11A, illustration of alignment state in the bulk 64A is omitted. FIG. 11B illustrates an example of an index ellipsoid showing refractive index anisotropy of the bulk 64A and the microparticles 64B when a voltage is applied between the lower electrode 32 and the upper electrode 36. FIG. 11C schematically illustrates an example of a state that the light L1 heading to the front face direction and the light L2 heading to a diagonal direction are scattered in the light modulation layer 64 when a voltage is applied between the lower electrode 32 and the upper electrode 36.

For example, as illustrated in FIGS. 10A and 10B, the bulk 64A and the microparticles 64B have a structure that the orientation of an optical axis AX3 of the bulk 64A corresponds with (is in parallel with) the orientation of an optical axis AX4 of the microparticles 64B when a voltage is not applied between the lower electrode 32 and the upper electrode 36. The light axes AX3 and AX4 represent a line in parallel with traveling direction of light ray in which refractive index becomes one value without relation to the polarization direction. Further, the orientations of the light axes AX3 and AX4 do not necessarily correspond with each other, but the orientations of the light axes AX3 and AX4 may be somewhat shifted due to, for example, manufacturing error or the like.

Further, the microparticles 64B have a structure that the optical axis AX4 is in parallel with the light incident face 10A of the light guide plate 10 when a voltage is not applied between the lower electrode 32 and the upper electrode 36. Further, for example, the microparticles 64B have a structure that the optical axis AX4 crosses with the normal line of the transparent substrates 31 and 37 at a slight angle θ3 (third angle) when a voltage is not applied between the lower electrode 32 and the upper electrode 36 (refer to FIG. 10B). For the angle θ3, a description will be given in detail in explaining a material of the microparticles 64B.

Meanwhile, the bulk 64A has a structure that the optical axis AX4 of the bulk 64A is constant without relation to presence of voltage application between the lower electrode 32 and the upper electrode 36. Specifically, for example, as illustrated in FIGS. 10A and 10B and FIGS. 11A and 11B, the bulk 64A has a structure that the optical axis AX3 of the bulk 64A is in parallel with the light incident face 10A of the light guide plate 10, and crosses with the normal line of the transparent substrates 31 and 37 at the slight angle θ3 (third angle). That is, the optical axis AX3 of the bulk 64A is in parallel with the optical axis AX4 of the microparticles 64B when a voltage is not applied between the lower electrode 32 and the upper electrode 36.

The optical axis AX4 is not necessarily in parallel with the light incident face 10A of the light guide plate 10, and does not necessarily cross with the normal line of the transparent substrates 31 and 37 at the angle θ3. For example, due to manufacturing error or the like, the optical axis AX4 may cross with the normal line of the transparent substrates 31 and 37 at an angle slightly different from the angle θ3. Further, the light axes AX3 and AX4 may not be necessarily in parallel with the light incident face 10A of the light guide plate 10. For example, due to manufacturing error or the like, the light axes AX3 and AX4 may cross with the light incident face 10A of the light guide plate 10 at a small angle.

It is preferable that ordinary light refractive index of the bulk 64A is equal to ordinary light refractive index of the microparticles 64B, and extraordinary light refractive index of the bulk 64A is equal to extraordinary light refractive index of the microparticles 64B. In this case, for example, when a voltage is not applied between the lower electrode 32 and the upper electrode 36, as illustrated in FIG. 10A, refractive index difference hardly exists in all directions including the front face direction and diagonal directions, and high transparency is able to be obtained. Thereby, for example, as illustrated in FIG. 10C, the light L1 heading to the front face direction and the light L2 heading to a diagonal direction are transmitted through the light modulation layer 64 without being scattered in the light modulation layer 64. In the result, as in the foregoing embodiment, for example, as illustrated in FIG. 6, the light L from the light source 20 (light from a diagonal direction) is totally reflected by the interface of a transparent region 30A (interface between the transparent substrate 31/the light guide plate 10 and air), and luminance of the transparent region 30A (luminance of black display) becomes lower than that in the case that the light modulation device 30 is not provided (dashed line in (B) in FIG. 6).

Further, for example, as illustrated in FIG. 11A, the bulk 64A and the microparticles 64B have a structure that the orientation of the optical axis AX3 is different from (crosses with) the orientation of the optical axis AX4 when a voltage is applied between the lower electrode 32 and the upper electrode 36. Further, when a voltage is applied between the lower electrode 32 and the upper electrode 36, for example, the microparticles 64B have a structure that the optical axis AX4 of the microparticles 64B is in parallel with the light incident face 10A of the light guide plate 10 and crosses with the normal line of the transparent substrates 31 and 37 at an angle θ4 (fourth angle) larger than the angle θ3, or is in parallel with the surface of the transparent substrates 31 and 37. For the angle θ4, a description will be given in detail in explaining a material of the microparticles 64B.

Thus, light propagating in a region where a voltage is applied between the lower electrode 32 and the upper electrode 36 includes many components of a diagonal direction. For example, in the case where an acryl light guide plate is used as the light guide plate 10, light in a region where a voltage is applied between the lower electrode 32 and the upper electrode 36 propagates at an angle of 41.8 degrees or more. In the result, in the light propagating in the region where a voltage is applied between the lower electrode 32 and the upper electrode 36, refractive index difference is increased, and high scattering characteristics are able to be obtained. Thereby, for example, as illustrated in FIG. 11C, the light L1 heading to the front face direction and the light L2 heading to a diagonal direction are scattered in the light modulation layer 64. As a result, as in the foregoing embodiment, for example, as illustrated in FIG. 6, the light L from the light source 20 (light from a diagonal direction) is transmitted through the interface of the scattering region 30B (interface between the transparent substrate 31/the light guide plate 10 and air), and light transmitted to the reflective plate 40 side is reflected by the reflective plate 40 and is transmitted through the light modulation device 30. Thus, luminance of the scattering region 30B becomes significantly higher than that in the case that the light modulation device 30 is not provided (dashed line in (B) in FIG. 6), and partial white display luminance (luminance rise) is increased by the decreased portion of luminance of the transparent region 30A.

The ordinary light refractive index of the bulk 64A and the ordinary light refractive index of the microparticles 64B may be somewhat shifted due to, for example, manufacturing error or the like, for example, are preferably 0.1 or less, and are more preferably 0.05 or less. Further, the extraordinary light refractive index of the bulk 64A and the extraordinary light refractive index of the microparticles 64B may be somewhat shifted due to, for example, manufacturing error or the like, for example, are preferably 0.1 or less, and are more preferably 0.05 or less.

Further, refractive index difference of the bulk 64A ($\Delta n0$=extraordinary light refractive index n1−ordinary light refractive index n0) and refractive index difference of the microparticles 64B ($\Delta n1$=extraordinary light refractive index n3−ordinary light refractive index n2) are preferably as large as possible, are preferably 0.05 or more, are more preferably 0.1 or more, and are much more preferably 0.15 or more. In the case where the refractive index difference of the bulk 64A and the microparticles 64B is large, scattering ability of the light modulation layer 64 becomes high, light guide conditions are able to be easily destroyed, and light from the light guide plate 10 is easily extracted.

Further, response speed to an electric field of the bulk 64A is different from that of the microparticles 64B. The bulk 64A has a linear structure or a porous structure that does not respond to an electric field, or a bar-like structure having response speed slower than response speed of the microparticles 64B. The bulk 64A is made of a polymer material obtained by polymerizing a low molecular monomer, for example. The bulk 64A is formed by polymerizing a material having alignment characteristics and polymerizable characteristics (for example, a monomer) that is, for example, aligned along the alignment direction of the microparticles 64B or the alignment direction of the alignment films 33 and 35 by at least one of heat and light.

Meanwhile, the microparticles 64B mainly contain, for example, a liquid crystal material, and have sufficiently higher response speed than response speed of the bulk 64A. The liquid crystal material (liquid crystal molecule) contained in the microparticles 64B is, for example, a rod-like molecule. As the liquid crystal molecule contained in the microparticles 64B, a liquid crystal molecule having negative dielectric constant anisotropy (so-called negative liquid crystal) is used.

When a voltage is not applied between the lower electrode 32 and the upper electrode 36, in the microparticles 64B, the long axis direction of the liquid crystal molecule is in parallel with the optical axis AX4. At this time, the long axis of the liquid crystal molecule in the microparticles 64B is in parallel with the light incident face 10A of the light guide plate 10, and crosses with the normal line of the transparent substrates 31 and 37 at the slight angle θ3. That is, when a voltage is not applied between the lower electrode 32 and the upper electrode 36, the liquid crystal molecule in the microparticles 64B is aligned being tilted by the angle θ3 in the plane in parallel with the light incident face 10A of the light guide plate 10. The angle θ3 is called pretilt angle, and is preferably from 0.1 degrees to 30 degrees both inclusive, for example. The angle θ3 is more preferably from 0.5 degrees to 10 degrees both inclusive, and much more preferably from 0.7 degrees to 2 degrees both inclusive. In the case where the angle θ3 is increased, scattering efficiency tends to be decreased for the reason described later. Further, in the case where the angle θ3 is excessively decreased (for example, almost 0 degrees), liquid crystal lowering azimuthal angle at the time of applying a voltage varies. For example, in some cases, the liquid crystal lowers in azimuth orientation on the opposite side by 180 degrees (reverse tilt). Thereby, refractive index difference between the microparticles 64B and the bulk 64A is not effectively used, and thus scattering efficiency tends to be decreased and luminance tends to be decreased.

Further, when a voltage is applied between the lower electrode 32 and the upper electrode 36, in the microparticles 64B, the long axis direction of the liquid crystal molecule crosses with (or is orthogonal to) the optical axis AX4. At this time, the long axis of the liquid crystal molecule in the microparticles 64B is in parallel with the light incident face 10A of the light guide plate 10, and crosses with the normal line of the transparent substrates 31 and 37 at the angle θ4 larger than the angle θ3. That is, when a voltage is applied between the lower electrode 32 and the upper electrode 36, the liquid crystal molecule in the microparticles 64B is aligned being tilted by the angle θ4 or horizontally lying at the angle θ4 (=90 degrees) in the plane in parallel with the light incident face 10A of the light guide plate 10.

As the foregoing monomer having alignment characteristics and polymerizable characteristics, a material that has anisotropy optically and that forms a composite material together with liquid crystal may be used. However, in this embodiment, a low molecular monomer that is cured by ultraviolet is preferable. It is preferable that in a state that a voltage is not applied, optical anisotropy direction of liquid crystal corresponds with that of a material formed by polymerizing a low molecular monomer (polymer material). Thus, it is preferable that the liquid crystal and the low molecular monomer are aligned in the same direction before ultraviolet curing. In the case where liquid crystal is used as the microparticles 64B and the liquid crystal is a rod-like molecule, the shape of a monomer material used is preferably rod-like as well. Accordingly, as the monomer material, a material having both polymerizable characteristics and crystallinity is preferably used. For example, the material preferably has at least one functional group selected from the group consisting of an acrylate group, a methacrylate group, an acryloyloxy group, a methacryloyloxy group, a vinylether group, and an epoxy group as a polymerizable functional group. The functional groups may be polymerized by irradiating with ultraviolet, infrared, or an electron ray or heating. To inhibit lowering of alignment level in irradiating with ultraviolet, a liquid crystalline material having a multifunctional group is able to be added. In the case where the bulk 64A has the foregoing linear structure, as a raw material of the bulk 64A, a bifunctional liquid crystalline monomer is preferably used. Further, it is possible that a monofunctional monomer is added to the raw material of the bulk 64A for the purpose of adjusting temperature showing liquid crystallinity, or a tri (or more) functional monomer is added to the raw material of the bulk 64A for the purpose of improving crosslink density.

Next, a description will be given of operation and effect of the backlight of this embodiment.

In the backlight of this embodiment, for example, a voltage is applied to the pair of electrodes (the lower electrode 32 and the upper electrode 36) of the respective light modulation cells 30B so that the optical axis AX4 of the microparticles 64B is in parallel with or almost in parallel with the optical axis AX3 of the bulk 64A in the light modulation cell 30A, and the optical axis AX4 of the microparticles 64B crosses with or is orthogonal to the optical axis AX3 of the bulk 64A in another light modulation cell 30A. Thereby, light that is outputted from the light source 20 and enters into the light guide plate 10 is transmitted through the transmission region 30A in which the optical axis AX3 and the optical axis AX4 are in parallel with or almost in parallel with each other in the light modulation device 30. Meanwhile, light that is outputted from the light source 20 and enters into the light guide plate 10 is scattered in the scattering region 30B in which the optical axis AX3 and the optical axis AX4 cross with each other or are orthogonal to each other in the light modulation device 30. Out of the scattered light, light transmitted through the lower face of the transmission region 30B is reflected by the reflective plate 40, and is returned to the light guide plate 10 again. After that, the light is outputted from the upper face of the backlight. Further, out of the scattered light, light headed to the upper face of the scattering region 30B is transmitted through the light guide plate 10. After that, the light is outputted from the upper face of the backlight. As described above, in this embodiment, light is hardly outputted from the upper face of the transmission region 30A, and light is outputted from the upper face of the scattering region 30B. Thereby, modulation ratio in the front face direction is increased.

Meanwhile, in this embodiment, the bulk 64A and the microparticles 64B mainly contain an optical anisotropic material. Thus, scattering characteristics are able to be decreased and transparency is able to be improved in a diagonal direction. For example, in a region where the bulk 64A mainly contain an optical anisotropic material with ordinary light refractive index and extraordinary light refractive index equal to those of an optical anisotropic material of the microparticles 64B and a voltage is not applied between the lower electrode 32 and the upper electrode 36, orientations of their light axes correspond with or almost correspond with each other. Thereby, refractive index difference in all directions including the front direction (normal line direction of the light modulation device 30) and diagonal directions is decreased or eliminated, and high transparency is able to be obtained. In the result, light leakage in the region of large view angle is able to be decreased or almost eliminated, and view angle characteristics are able to be improved.

For example, in the case where liquid crystal having ordinary light refractive index of 1.5 and extraordinary light refractive index of 1.65 and a liquid crystalline monomer having ordinary light refractive index of 1.5 and extraordinary light refractive index of 1.65 are mixed, and the liquid crystalline monomer is polymerized in a state that the liquid crystal and the liquid crystalline monomer are aligned by an alignment film or an electric field, optical axis of the liquid crystal correspond with optical axis of a polymer formed by polymerizing the liquid crystalline monomer. Thereby, refractive index is able to be identical in all directions. Thus, in this case, high transparency state is able to be realized, and view angle characteristics are able to be further improved.

Further, in this embodiment, for example, as illustrated in FIG. 6, luminance of the transparent region 30A (luminance of black display) is lower than that in the case that the light modulation device 30 is not provided (dashed line in (B) in FIG. 6). Meanwhile, luminance of the scattering region 30B is significantly higher than that in the case that the light modulation device 30 is not provided (dashed line in (B) in FIG. 6), and partial white display luminance (luminance rise) is increased by the reduced portion of luminance of the transparent region 30A for the following reason. That is, the bulk 64A and the microparticles 64B mainly contain the optical anisotropic material. Thus, scattering characteristics in a diagonal direction are inhibited, and leaked light from the light guide plate in dark state is little. Thereby, light guide is performed from a partially dark state section to a partially light state section. Thus, luminance rise is able to be realized without increasing input electric power to the backlight.

Further, in this embodiment, the optical axis AX4 of the microparticles 64B is in parallel with the light incident face 10A of the light guide plate 10, and crosses with the normal line of the transparent substrates 31 and 37 at a slight angle θ3 in the region where a voltage is not applied between the lower electrode 32 and the upper electrode 36. That is, the liquid crystal molecule contained in the microparticles 64B is aligned being tilted by the angle θ3 in the plane in parallel with the light incident face 10A (pretilt angle is given). Thus, when a voltage is applied between the lower electrode 32 and the upper electrode 36, the liquid crystal material contained in the microparticles 64B does not fall in a random orientation, but falls in the plane in parallel with the light incident face 10A. At this time, the light axes AX 3 and AX4 of the bulk 64A and the microparticles 64B cross with each other or are orthogonal to each other in the plane in parallel with the light incident face 10A. In this case, in light entering from the light incident face 10A of the light guide plate 10, light oscillating perpendicular to the transparent substrate 31 senses difference between ordinary light refractive index of the microparticles 64B and extraordinary light refractive index of the bulk 64A. At this time, since the difference between ordinary light refractive index of the microparticles 64B and extraordinary light refractive index of the bulk 64A is large, scattering efficiency of the light oscillating perpendicular to the transparent substrate 31 is increased. Meanwhile, light oscillating in parallel with the transparent substrate 31 senses the difference between extraordinary light refractive index of the microparticles 64B and ordinary light refractive index of the bulk 64A. At this time, since the difference between extraordinary light refractive index of the microparticles 64B and ordinary light refractive index of the bulk 64A is large, scattering efficiency of the light oscillating in parallel with the transparent substrate 31 is increased. Therefore, light propagating in a region where a voltage is applied between the lower electrode 32 and the upper electrode 36 includes many components of a diagonal direction. For example, in the case where an acryl light guide plate is used as the light guide plate 10, light in a region where a voltage is applied between the lower electrode 32 and the upper electrode 36 propagates at an angle of 41.8 degrees or more. In the result, refractive index difference is increased, and high scattering characteristics are able to be obtained, and accordingly display luminance is able to be improved. Further, due to effect of the foregoing luminance rise, display luminance is able to be further improved.

For example, in the case where the light axes AX3 and AX4 of the bulk 64A and the microparticles 64B are arranged in parallel with the light incident face 10A of the light guide plate 10 and almost in parallel with the normal line of the transparent substrates 31 and 37 when a voltage is not applied, and in the case where the liquid crystal material contained in the microparticles 64B falls in the plane perpendicular to the light incident face 10A when a voltage is applied between the lower electrode 32 and the upper electrode 36, light oscillating perpendicular to the transparent substrate 31 senses difference between ordinary light refractive index of the microparticles 64B and extraordinary light refractive index of the bulk 64A, while light oscillating in parallel with the transparent substrate 31 senses difference between ordinary light refractive index of the microparticles 64B and ordinary light refractive index of the bulk 64A. The difference between ordinary light refractive index of the microparticles 64B and ordinary light refractive index of the bulk 64A hardly exists, or does not exist at all. Thus, in light entering from the light incident face 10A, the light oscillating perpendicular to the transparent substrate 31 senses large refractive index difference as in the foregoing case, while the light oscillating in parallel with the transparent substrate 31 hardly senses refractive index difference or does not sense refractive index difference at all. In the result, scattering efficiency of light oscillating perpendicular to the transparent substrate 31 becomes high, while scattering efficiency of light oscillating in parallel with the transparent substrate 31 is low or zero. Thus, in the case where the light axes AX3 and AX4 are arranged perpendicular to the light incident face 10A, scattering efficiency is lower than that in the case that the light axes AX3 and AX4 are arranged in parallel with the light incident face 10A, and therefore luminance extracted from the light guide plate 10 is lower than that of the light modulation device 30 of this embodiment.

Further, in the case where pretilt is not formed or pretilt angle is almost 90 degrees substantially, orientation in which liquid crystal falls becomes random. Thus, in this case, the refractive index difference becomes an average of refractive index difference when the optical axis AX3 of the bulk 64A and the optical axis AX4 of the microparticles 64B are in parallel with the light incident face 10A of the light guide plate 10 and refractive index difference when the optical axis AX3 of the bulk 64A and the optical axis AX4 of the microparticles 64B are perpendicular to the light incident face 10A of the light guide plate 10. Thus, in this case, extracted luminance becomes lower than that in the case that the optical axis AX3 of the bulk 64A and the optical axis AX4 of the microparticles 64B are in parallel with the light incident face 10A of the light guide plate 10.

Accordingly, in this embodiment, display luminance is able to be improved while light leakage in a range of large view angle is decreased or is almost eliminated. In the result, modulation ratio in the front face direction is able to be increased.

Modified Example

Figure 12:
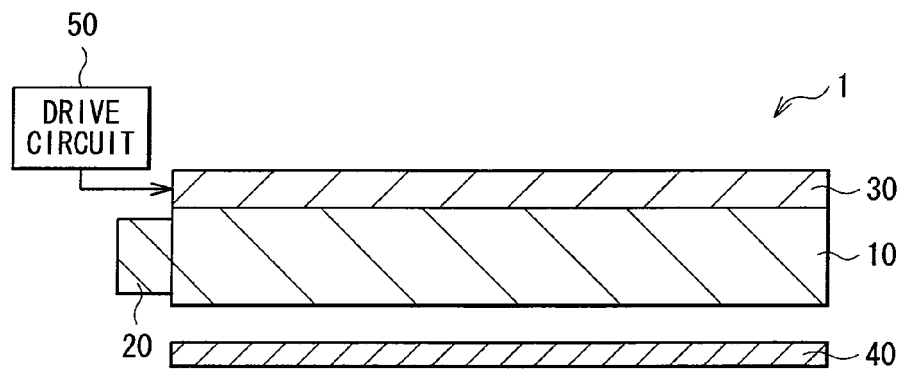
FIG. 12 is a cross sectional view illustrating another example of a structure of the backlight of FIG. 1A.
Figure 13:
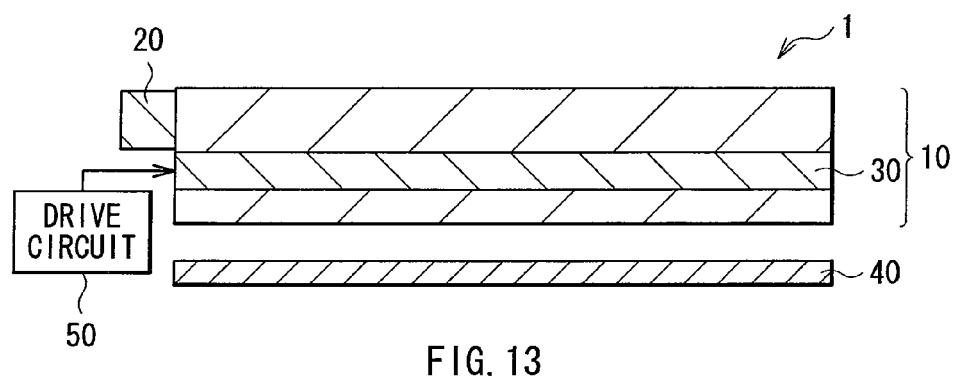
FIG. 13 is a cross sectional view illustrating still another example of a structure of the backlight of FIG. 1A.

In the foregoing respective embodiments, the light modulation device 30 is contacted with the rear face (lower face) of the light guide plate 10 without an air layer in between. However, for example, as illustrated in FIG. 12, the light modulation device 30 may be contacted with the upper face of the light guide plate 10 without an air layer in between. Further, for example, as illustrated in FIG. 13, the light modulation device 30 may be provided inside the light guide plate 10. In this case, it is necessary that the light modulation device 30 is contacted with the light guide plate 10 without an air layer in between.

Figure 14:
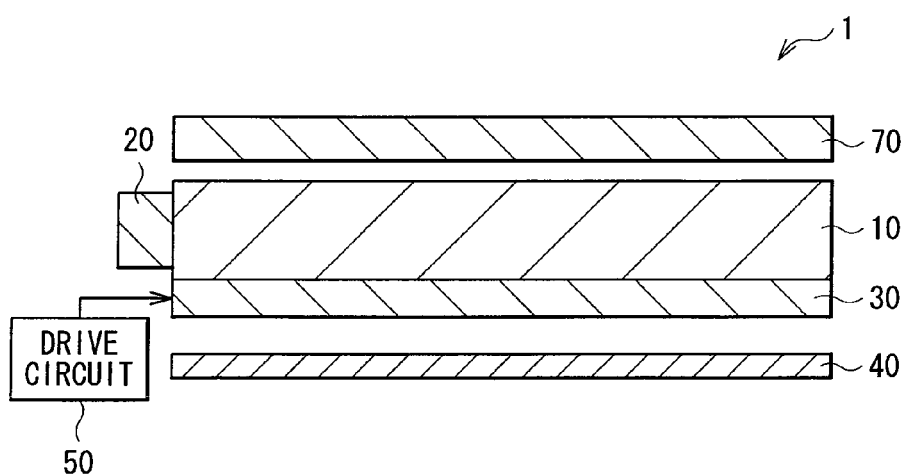
FIG. 14 is a cross sectional view illustrating still another example of a structure of the backlight of FIG. 1A.

In the foregoing respective embodiments, nothing is particularly provided on the light guide plate 10. However, for example, as illustrated in FIG. 14, an optical sheet 70 (for example, a diffusion plate, a diffusion sheet, a lens film, a polarization split sheet or the like) may be provided. In this case, part of light outputted in a diagonal direction from the light guide plate 10 rises in the front face direction, and thus modulation ratio is able to be improved effectively.

Anisotropic Diffusion

Figure 15A:
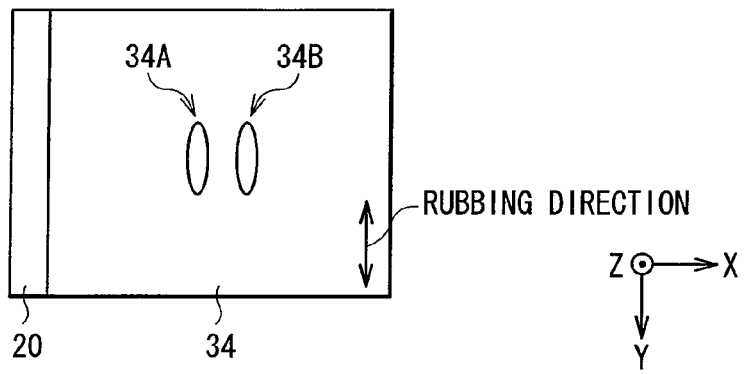
FIGS. 15A and 15B are schematic views for explaining operation of the light modulation device of FIGS. 1A and 1B.
Figure 15B:
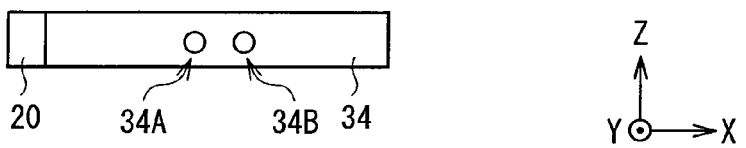
Figure 16A:
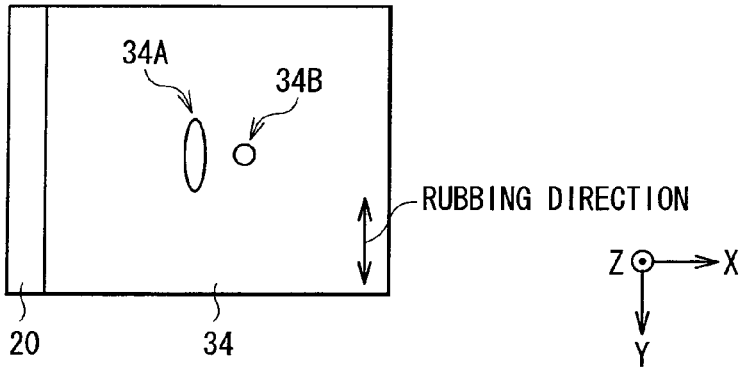
FIGS. 16A and 16B are schematic views for explaining operation of the light modulation device of FIGS. 1A and 1B.
Figure 16B:
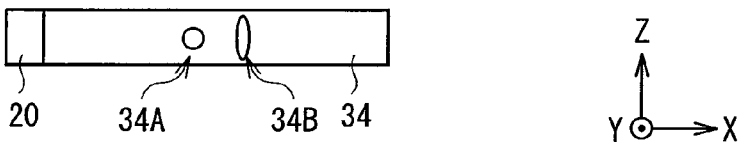

FIGS. 15A to 16B illustrate an example of an index ellipsoid of the bulk 34A and the microparticles 34B in the light modulation layer 34 of the foregoing first embodiment. FIGS. 15A and 15B illustrate an example of an index ellipsoid of the bulk 34A and the microparticles 34B when a voltage is not applied between the lower electrode 32 and the upper electrode 36. FIGS. 16A and 16B illustrate an example of an index ellipsoid of the bulk 34A and the microparticles 34B when a voltage is applied between the lower electrode 32 and the upper electrode 36.

As described before, as illustrated in FIGS. 15A and 15B, the optical axis of the bulk 34A and the optical axis of the microparticles 34B are oriented in the direction that is in parallel with the light incident face 10A of the light guide plate 10 and that crosses with the surface of the substrates 31 and 37 at the angle $\theta 1$ when a voltage is not applied between the lower electrode 32 and the upper electrode 36. Further, as described before, as illustrated in FIGS. 16A and 16B, when a voltage is applied between the lower electrode 32 and the upper electrode 36, the optical axis of the bulk 34A is oriented in the same direction as that when a voltage is not applied between the lower electrode 32 and the upper electrode 36. Further, the optical axis of the microparticles 34B is oriented in the direction that is in parallel with the light incident face 10A of the light guide plate 10 and that crosses with the surface of the transparent substrates 31 and 37 at the angle $\theta 2$ (for example, 90 degrees) larger than the angle $\theta 1$.

As described above, the liquid crystal molecule in the microparticles 34B show the foregoing change according to presence of voltage application. In the course of the change, the bulk 34A does not respond to voltage change, and the long axis direction of the linear structure of the bulk 34A is oriented in the rubbing direction (direction in parallel with the light incident face 10A (Y axis direction of FIGS. 15A to 16B). Thus, when a voltage is applied between the lower electrode 32 and the upper electrode 36, light that is outputted from the light source 20 and propagates in the light modulation layer 34 propagates while sensing difference between extraordinary light refractive index of the microparticles 34B and ordinary light refractive index of the bulk 34A in cycles of average linear texture size in the short axis direction of the linear structure of the bulk 34A. In the result, the light propagating in the light modulation layer 34 is largely scattered in the thickness direction of the light modulation layer 34, but is not scattered much in the direction in parallel with the light incident face 10A. That is, the light modulation layer 34 shows anisotropic scattering to the light that is outputted from the light source 20 and propagates in the light modulation layer 34. A description will be hereinafter given of inspection how much the light modulation layer 34 actually shows anisotropic scattering.

Figure 17A:
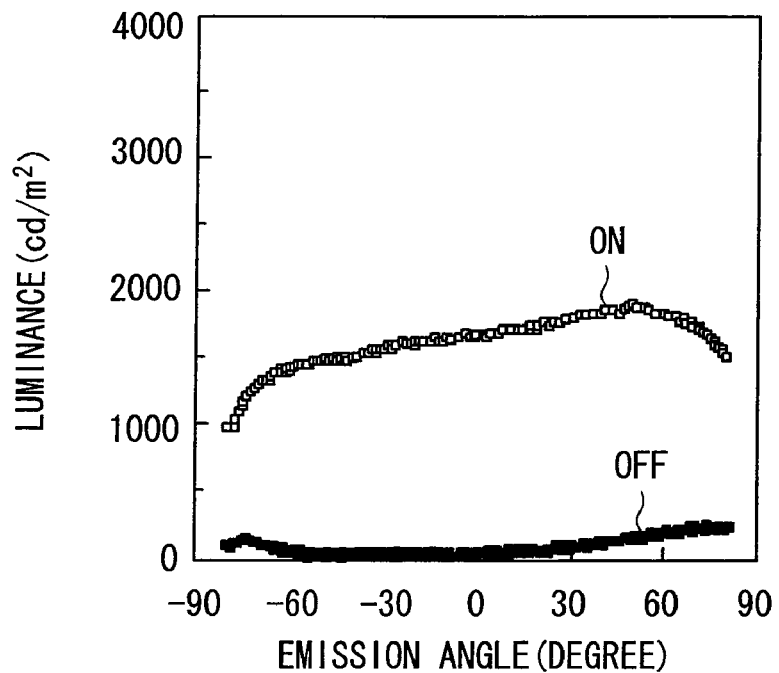
FIGS. 17A and 17B are diagrams for explaining effect of the light modulation device of FIGS. 1A and 1B and a comparative example.
Figure 17B:
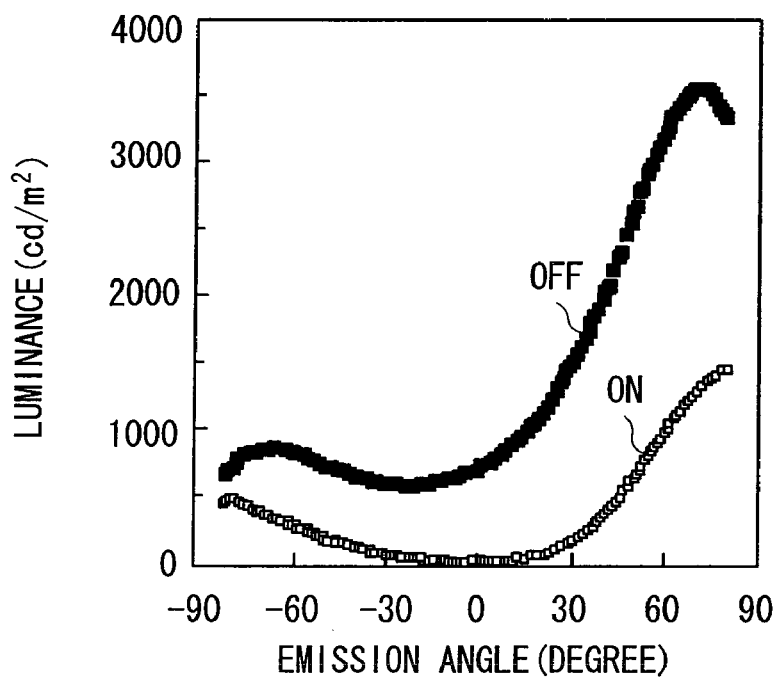

FIGS. 17A and 17B illustrate results of measuring output angle characteristics of light from the light guide plate. FIG. 17A illustrates a result of a case using a light modulation layer showing optical isotropy in a plane. FIG. 17B illustrates a result of a case using the modulation layer 34. In general, a white reflective plate is used on the lower face of the light modulation layer. However, to accurately examine output characteristics from the light modulation layer and the light guide plate, a black absorption layer was arranged on the lower face of the light modulation layer instead of the white reflective plate.

In the case where the light modulation layer showing optical isotropy in a plane was used, in light extracted from the light guide plate, there were many components located near the light guide plate by a narrow margin, and there were few components in the front face direction. Meanwhile, in the case where the modulation layer 34 showing optical anisotropy in a plane was used, light in the front face direction was relatively large at the time of being extracted from the light guide plate, and such profile was suitable for an illuminating device. Further, in a black state, light diagonally leaked in the optically isotropic modulation layer was larger than that in the anisotropic light modulation layer, leads to an advantage in terms of light modulation ratio performance. Further, in the case where an optical sheet was used on the light guide plate with an air interface in between, light lost by reflection by the interface between the optical sheet and air may be high. Thus, as characteristics of output from the light guide plate, it is suitable that the component in the front face direction is large. In the two light modulation layers used for inspection, the respective used monomer materials and the respective used liquid crystal materials were different from each other, and thus each light extraction intensity itself was difficult to be compared to each other. However, in the case where a material having the same optical property as the light modulation layer was used, light usage efficiency was able to be more improved in the case where the light modulation layer 34 having optical anisotropy in a plane was used.

Figure 18A:
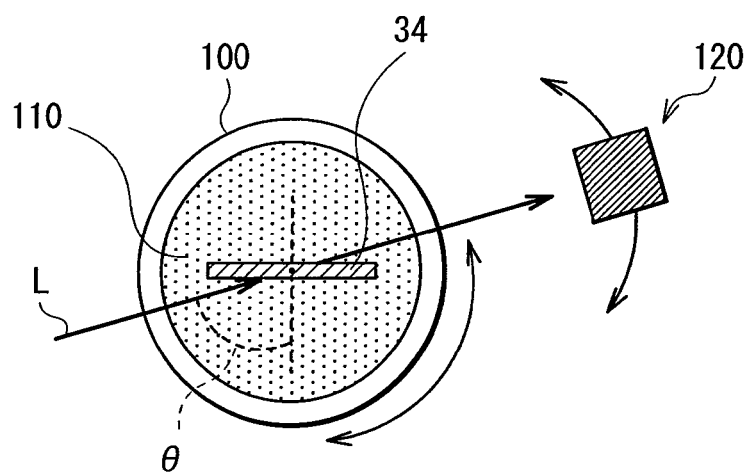
FIGS. 18A and 18B are views illustrating an example of equipment for measuring optical characteristics of the light modulation device.
Figure 18B:
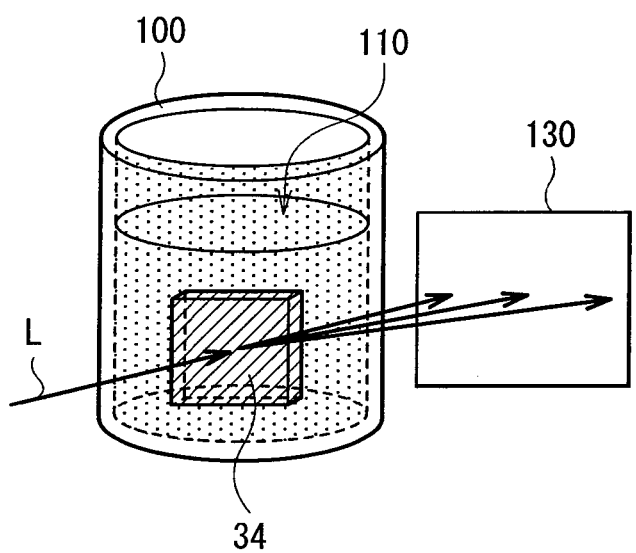
Figure 19A:
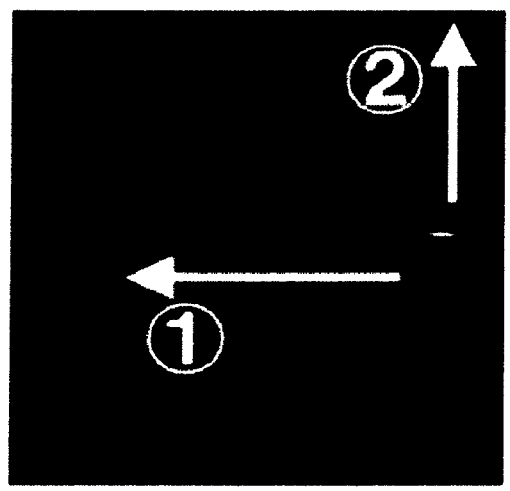
FIGS. 19A to 19C are diagrams illustrating results of measurement by the equipment of FIGS. 18A and 18B.
Figure 19B:
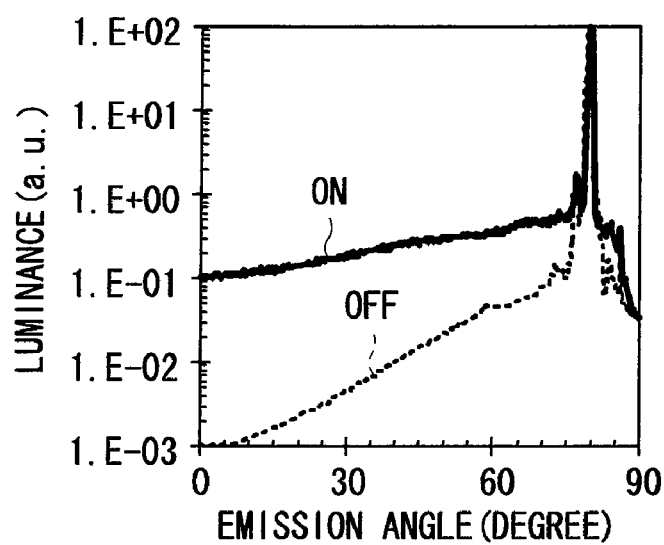
Figure 19C:
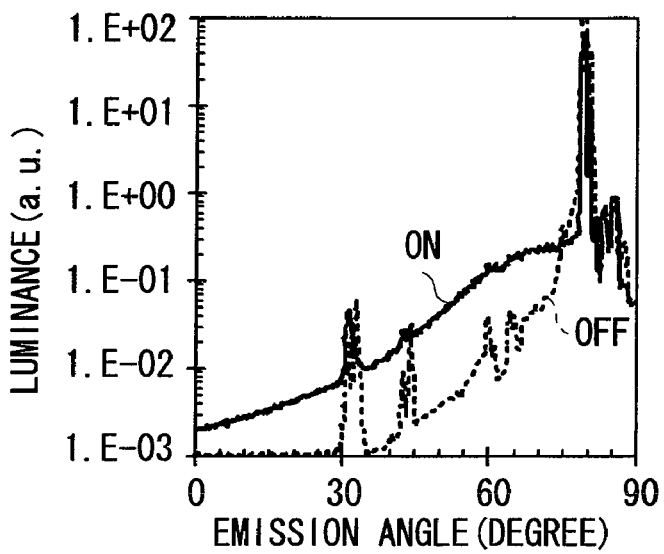

From the foregoing results, it was found that in the case where the two light modulation layer were used, the respective output angle characteristics were different from each other. Next, scattering characteristics of the light modulation layer 34 itself were measured. In a state that the light guide plate was used, all reflection by the light guide plate was generated, and scattering angle characteristics were not able to be measured. Thus, the scattering angle characteristics were measured by the equipment illustrated in FIGS. 18A and 18B. Specifically, matching oil 110 and the light modulation layer 34 were put into a columnar glass container 100. The light modulation layer 34 was irradiated with laser light L at large incident angle $\theta$ (for example, 80 degrees) so that light was guided through the light guide plate, and the scattering angle characteristics were evaluated. A state of luminance distribution shown on a measured face 130 when the laser light L entered the light modulation layer 34 at the large incident angle $\theta$ (for example, 80 degrees) is illustrated in FIG. 19A. Further, a light intensity distribution obtained by scanning of a detector 120 by setting an axis in parallel with the optical axis AX1 (not illustrated) of the bulk 34A in the light modulation layer 34 as the central axis in a plane perpendicular to the rubbing direction (corresponding to ZX plane of FIG. 15A to FIG. 16B) is illustrated in FIG. 19B. The light intensity distribution at this time corresponds to the distribution in the direction 1 in FIG. 19A. Further, a luminance distribution obtained by scanning of the detector 120 by setting an axis perpendicular to the optical axis AX1 (not illustrated) of the bulk 34A in the light modulation layer 34 as the central axis in a plane in parallel with the rubbing direction and in a plane in parallel with the light incident face of the light modulation layer 34 (corresponding to ZY plane of FIG. 15A to FIG. 16B) is illustrated in FIG. 19C. The light intensity distribution at this time corresponds to the distribution in the direction 2 in FIG. 19A.

Figure 21A:
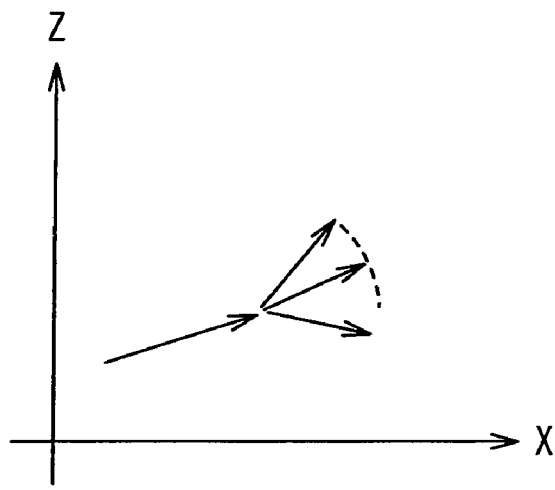
FIGS. 21A to 21C are conceptual views for explaining anisotropic scattering.
Figure 21B:
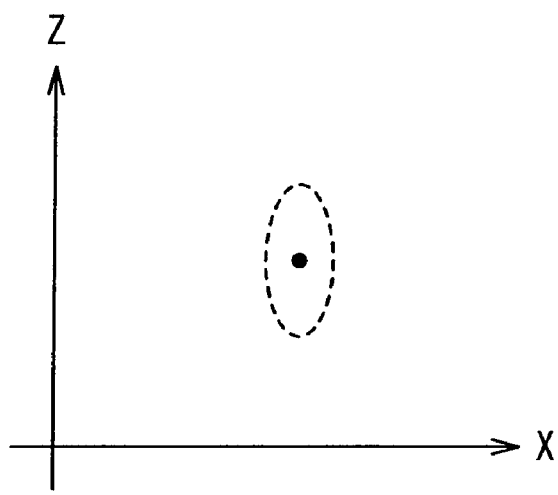
Figure 21C:
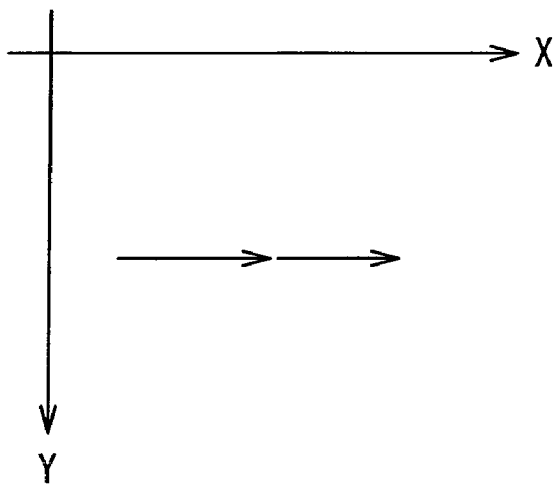

From FIGS. 19A to 19C, it was found that scattering characteristics in the plane perpendicular to the rubbing direction (corresponding to the ZX plane of FIG. 15A to FIG. 16B) were higher then those in the plane in parallel with the rubbing direction (corresponding to the ZY plane of FIG. 15A to FIG. 16B). In the front face direction (output angle: 0 degrees), each intensity was different by about 50 times (when a voltage was applied). That is, it was found that, for example, as illustrated in FIGS. 21A to 21C, the light modulation layer 34 had anisotropic scattering characteristics in which scattering in the thickness direction (Z axis direction) of the light modulation layer 34 was larger than scattering in the rubbing direction (direction in parallel with the light incident face 10A (Y axis direction)). Accordingly, it was found that by aligning the liquid crystal molecules in the microparticles 34B in the thickness direction of the light modulation layer 34 in a state that the long axis direction of the linear structure of the bulk 34A is oriented in the direction in parallel with the rubbing direction (direction in parallel with the light incident face 10A (Y axis direction of FIGS. 15A to 16B)), the light modulation layer 34 showed the foregoing anisotropic scattering to the light outputted from the light source 20.

Figure 20A:
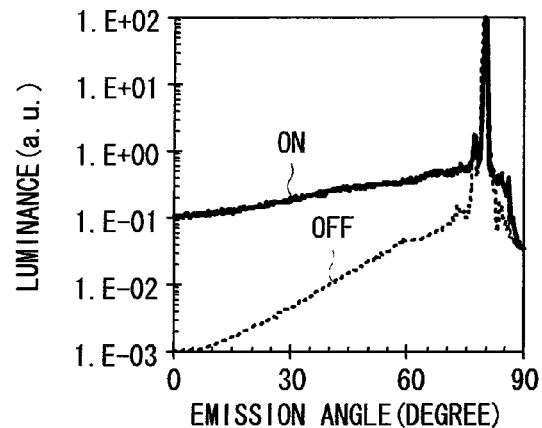
FIGS. 20A to 20C are diagrams illustrating results of measurement by the equipment of FIGS. 18A and 18B.
Figure 20A:
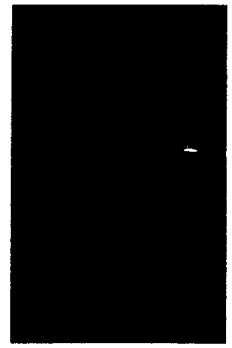
Figure 20B:
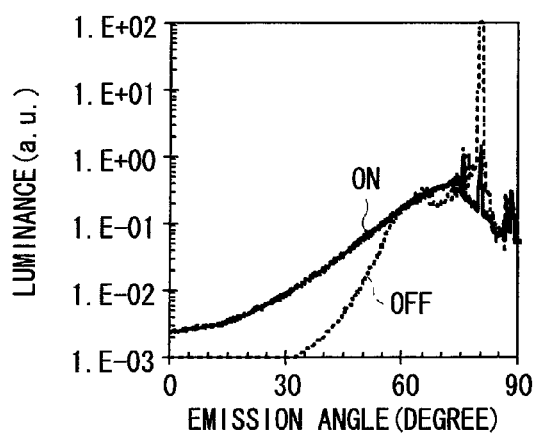
Figure 20B:
Figure 20C:
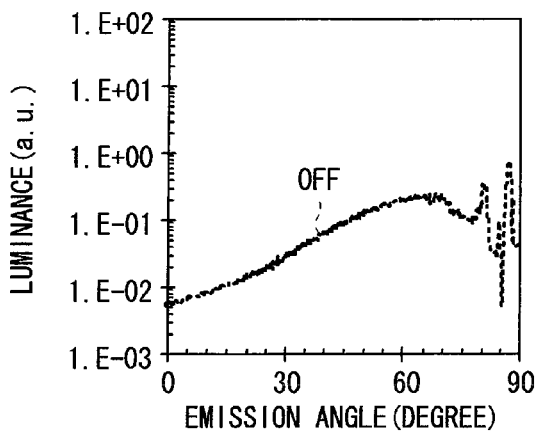
Figure 20C:

FIG. 20A illustrates scattering characteristics of the light modulation layer 34. FIG. 20B illustrates scattering characteristics of a light modulation layer in which tilt orientation of liquid crystal is not determined by a voltage (pretilt: 90 degrees). FIG. 20C illustrates scattering characteristics of a normal light modulation layer that is made of an isotropic polymer and does not show in-plane optical anisotropy. From FIGS. 20A to 20C, it was found that in the light modulation layer 34, entered light is largely scattered even in the front face direction compared to in the other light modulation layers, and only light modulation layer 34 showed anisotropic scattering.

Figure 22A:
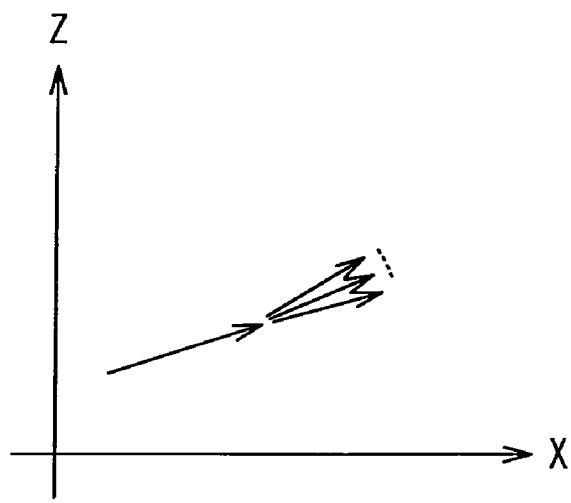
FIGS. 22A to 22C are conceptual views for explaining isotropic scattering.
Figure 22B:
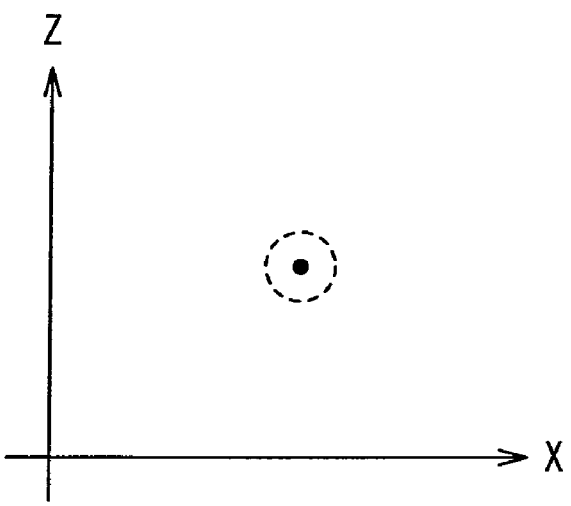
Figure 22C:
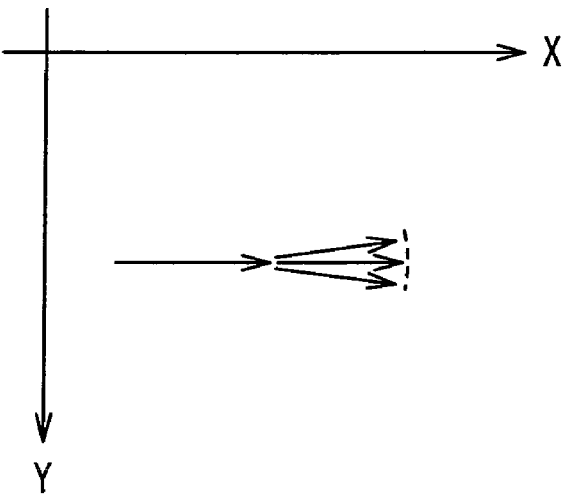

Next, a description will be given of a reason why light extraction from the light guide plate is superior in the case where the foregoing anisotropic scattering is shown. In the case where a light modulation layer, a light guide plate, and a light source are arranged, for example, as illustrated in FIGS. 22A to 22C, a light guide plate printed with a white pattern and the foregoing normal light modulation layer show isotropic scattering characteristics. Thus, light scattering in the direction in parallel with the in-plane of the light guide plate is large, and a ratio to change the angle until light guide conditions are destroyed becomes small. Meanwhile, in the case where anisotropic scattering is shown as in the light modulation layer 34, for example, as illustrated in FIGS. 21A to 21C, entered light is largely scattered in the direction perpendicular to the in-plane direction of the light guide plate, and thus scattering is generated preferentially in the direction where light guide conditions are destroyed. Accordingly, light extraction efficiency from the light guide plate is improved by showing anisotropic scattering.

In terms of improving scattering characteristics of guided light, an average linear texture size in the short axis direction of the bulk 34A is preferably from 0.1 μm to 10 μm both inclusive, and is more preferably from 0.2 μm to 2.0 μm both inclusive.

Application Example

A description will be given of an application example of a backlight of the foregoing respective embodiments.

Figure 23:
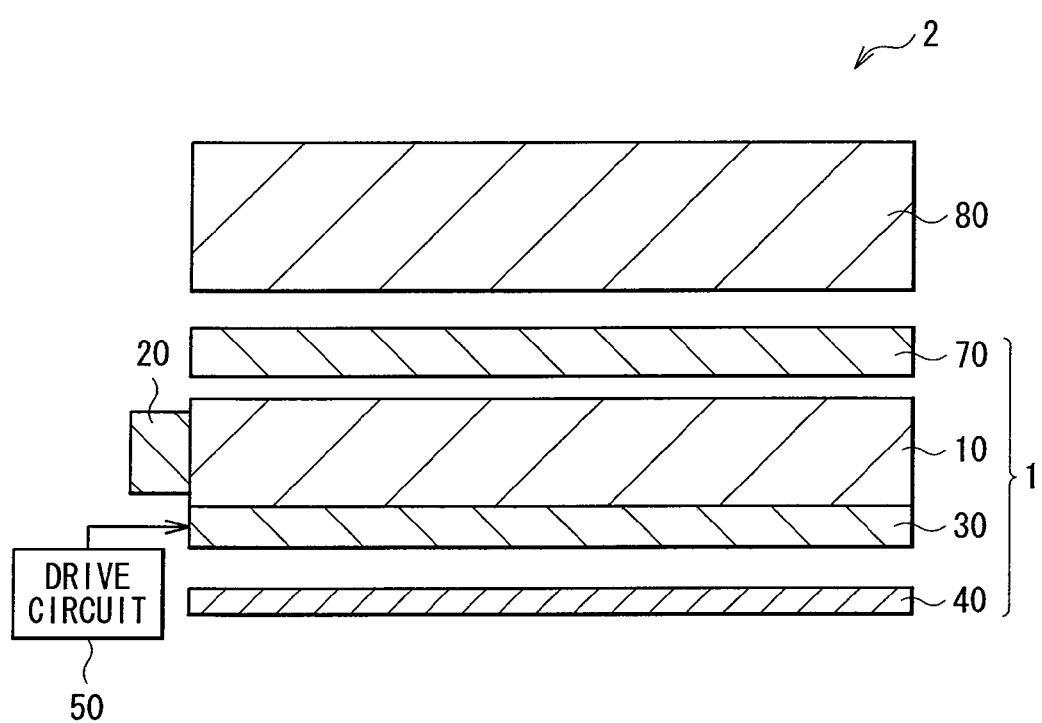
FIG. 23 is a cross sectional view illustrating an example of a display unit according to an application example.

FIG. 23 illustrates an example of a schematic structure of a display unit 2 according to this application example. The display unit 2 includes a liquid crystal display panel 80 (display panel) and the backlight 1 arranged behind the liquid crystal display panel 80. As the backlight mounted on the display unit 2, both the backlight of the first embodiment and the backlight of the second embodiment are able to be used.

The liquid crystal display panel 80 is intended to display image. The liquid crystal display panel 80 is, for example, a transmissive display panel in which respective pixels are driven according to a video signal, and has a structure in which a liquid crystal layer is sandwiched between a pair of transparent substrates. Specifically, the liquid crystal display panel 80 has a light polarizer, a transparent substrate, a pixel electrode, an alignment film, a liquid crystal layer, an alignment film, a common electrode, a color filter, a transparent substrate, and a light polarizer sequentially from the backlight 1 side.

The transparent substrate is made of a substrate transparent to visible light such as a plate glass. Though not illustrated, in the transparent substrate on the backlight 1 side, an active drive circuit including a TFT (Thin Film Transistor) electrically connected to the pixel electrode, a wiring and the like is formed. The pixel electrode and the common electrode are made of, for example, ITO. The pixel electrodes are, for example, arranged in a matrix state or in a delta state on the transparent substrate, and functions as an electrode for every pixel. Meanwhile, the common electrode is formed on one face on the color filter, and functions as a common electrode opposed to the respective pixel electrodes. The alignment film is made of, for example, a polymer material such as polyimide, and perform alignment treatment for liquid crystal. The liquid crystal layer is composed of, for example, Vertical Alignment (VA) mode/Twisted Nematic (TN) mode/Super Twisted Nematic (STN) mode liquid crystal. The liquid crystal layer has a function to change orientation of a polarizing axis of outputted light from the backlight unit 1 for every pixel according to an applied voltage from a drive circuit (not illustrated). Orientation of transmission axis for every pixel is provided with multistage-adjustment by performing multistage-change of liquid crystal arrangement. In the color filter, color filters for providing light transmitted through the liquid crystal layer with color separation into three primary colors of red (R), green (G), and blue (B) or providing light transmitted through the liquid crystal layer with color separation into four colors such as R, G, B, and white (W) are arranged correspondingly to pixel electrode arrangement. Examples of filter arrangement (pixel arrangement) include, in general, stripe arrangement, diagonal arrangement, delta arrangement, and rectangle arrangement.

The light polarizer is a kind of optical shutter, and transmits only light (polarized light) in a certain oscillation direction. The light polarizer may be an absorption type polarization device that absorbs light (polarized light) in oscillation directions other than a transmission axis. However, the light polarizer is preferably a reflective polarization device that reflects light to the backlight 1 side in terms of improving luminance. The respective light polarizers are arranged so that each polarization axis is different by 90 degrees. Thereby, light outputted from the backlight 1 is transmitted through the liquid crystal layer or blocked.

The drive circuit 50 controls magnitude of a voltage applied to the pair of electrodes (the lower electrode 32 and the upper electrode 36) of the respective light modulation cells 30-1 so that the optical axis AX2 of the microparticles 34B is in parallel with the optical axis AX1 of the bulk 34A in a cell corresponding to black display pixel position of the plurality of light modulation cells 30-1, and the optical axis AX2 of the microparticles 34B crosses with the optical axis AX1 of the bulk 34A in a cell corresponding to white display pixel position of the plurality of light modulation cells 30-1.

In this application example, as a light source illuminating the liquid crystal display panel 80, the backlight 1 of the foregoing embodiment is used. Thereby, display luminance is able to be improved while light leakage in a range of a large view angle is decreased or almost eliminated. In the result, modulation ratio in the front face direction is able to be increased. Further, luminance rise is able to be realized without increasing input electric power to the backlight 1.

Further, in this application example, the backlight 1 partially modulates intensity of light entering into the liquid crystal display panel 80 according to the display image. However, in the case where intense light change exists in a pattern edge section of the electrodes (the lower electrode 32 and the upper electrode 36) included in the light modulation device 30, the interface section thereof is seen on the display image. Thus, it is desired to obtain characteristics in which light is flatly changed in the electrode interface section as much as possible. Such characteristics are called gradation characteristics. To increase the gradation characteristics, it is effective to use a diffusion plate with strong diffusion characteristics. However if the diffusion characteristics are strong, total light ray transmittance is decreased, and thereby brightness tends to be decreased. Thus, in the case where a diffusion plate is used as the optical sheet 70 in this application example, total light ray transmittance of the diffusion plate is preferably from 50% to 85% both inclusive, and more preferably from 60% to 80% both inclusive. Further, as a spatial distance between the light guide plate 10 and the diffusion plate in the backlight 1 is increased, the gradation characteristics are further improved. In addition, it is possible to adjust a voltage of each electrode by increasing the number of patterns of the electrodes (the lower electrode 32 and the upper electrode 36) included in the light modulation device 30 and flatly switching between brightness and darkness as much as possible.

EXAMPLES

A description will be hereinafter given of examples of the application. The following examples are given as an exemplification, and the application is not limited to these examples.

Cell Formation Method

A glass substrate coated with ITO (dimensions: 30×40 mm) was washed with an alkali cleaning fluid under ultrasonic application. After that, the resultant was rinsed with ultrapure water and blow-dried, and subsequently an electrode substrate was obtained. The electrode substrate was coated with a polyimide horizontal alignment film by a spin coater, and fired at 200 deg C. After that, rubbing was made with the use of a rubbing cloth to form a horizontal alignment film. Plastic beads having an average particle diameter of 7 µm were sprayed on the electrode substrate on which the alignment film was formed, around which was subsequently coated with a thermosetting seal agent. Further, an electrode substrate to be an opposite electrode similarly formed was laid thereon to perform curing treatment to form a vacant cell. A solution formed so that liquid crystal, an ultraviolet curing liquid crystalline monomer, and a polymerization initiator were mixed at a given composition (hereinafter referred to as a monomer mixed liquid crystal) was injected into the vacant cell. The monomer mixed liquid crystal was injected while being heated according to needs. The cell injected with the monomer mixed liquid crystal was inserted between crossed nicol light polarizers, and alignment state was visually checked with transmitted light. After that, ultraviolet was irradiated to cure a polymerizable monomer in the liquid crystal.

Evaluation Method

1. Refractive Index

Refractive index of the liquid crystal and the monomer was measured by using an Abbe refractometer. A lower face of a glass stage and an upper glass block were coated with the horizontal alignment film to align the liquid crystal or the monomer. The light polarizer was bonded to an eyepiece tubular section to change outputted polarization component, and thereby ordinary light refractive index (n0) and extraordinary light refractive index (ne) were obtained. Evaluation was made under conditions that a bandpass filter was applied to entering white light, incident wavelength was 589 nm, and temperature was 25 deg C.

2. Luminance and Modulation Ratio

An acryl light guide plate having a thickness of 5 mm was bonded to the upper layer of the formed glass cell with a matching oil having refractive index of 1.51 to form a liquid crystal cell. After that, an end face of the acryl light guide plate was irradiated with white LED light. The acryl light guide plate was arranged so that the light incident face of the acryl light guide plate irradiated with the white LED light was in parallel with (or perpendicular to) the rubbing direction. A white reflective plate was laid on the lower face of the formed liquid crystal cell with an air layer in between, and front luminance in the normal line direction of the acryl light guide plate was measured by using a conoscope made by Autronic Co. Further, a diffusion sheet and a lens sheet were laid on the acryl light guide plate, and front luminance in the normal line direction of the acryl light guide plate was measured. A case of not applying a voltage to the liquid crystal cell was regarded as black luminance, a case of applying a voltage to the liquid crystal cell was regarded as white luminance, and white luminance/black luminance value was regarded as modulation ratio. The applied voltage was 70 V (100 Hz pulse). Further, a film liquid crystal cell previously bonded to an acryl light guide plate was also used. At that time, an end face of the acryl light guide plate was irradiated with white LED light so that the rubbing direction of the film liquid crystal cell becomes in parallel with (or perpendicular to) the light incident face of the acryl light guide plate.

3. Pretilt and Optical Axis

A pretilt angle of the liquid crystal cell was calculated as follows. That is, incident angle dependence of retardation of wavelength 589 nm was measured by using a fast spectroscopy ellipsometer (M-2000) made by Woollam Co., and the pretilt angle of the liquid crystal cell was calculated from the foregoing measurement value by using crystal rotation method. Optical axis of the liquid crystal cell when a voltage was not applied was obtained by using the foregoing ellipsometer. Further, orientation of optical axis at the time of applying a voltage was checked by measuring retardation while changing incident angle to the liquid crystal cell in the plane including a pretilt orientation while applying a voltage, and observing that incident angle at which retardation shows the maximum value (or minimum value) was increased as the voltage was increased.

4. Minute Structure

A minute structure of the formed liquid crystal cell was observed by arranging the liquid crystal cell between the crossed nicol light polarizers while applying a positive and negative pulse voltage 70 V (100 Hz, Duty: 50%). The liquid crystal cell was arranged so that absorption axis of one side light polarizer crosses with the pretilt direction at 45 degrees.

Table 1 illustrates combinations of liquid crystal and a monomer in Examples and Comparative examples and an evaluation result thereof.

TABLE 1

|  | Composition | | | No optical film | | | Diffusion sheet/lens sheet | | |
| --- | --- | --- | --- | --- | --- | --- | --- | --- | --- |
|  | Liquid crystal | Monomer | (liquid crystal:monomer) | Black luminance | White luminance | Modulation ratio | Black luminance | White luminance | Modulation ratio |
| Example 1 | LC1 | MN1 | 90:10 | 121.3 | 3754 | 31.0 | 232.6 | 4079 | 17.5 |
| Example 2 | LC1 | MN1 | 95:5 | 86.0 | 2034 | 23.7 | 161.8 | 2296 | 14.2 |
| Example 3 | LC1 | MN1 | 85:15 | 120.4 | 2061 | 17.1 | 195.0 | 2364 | 12.1 |
| Example 4 | LC1 | MN2 | 90:10 | 154.2 | 2951 | 19.1 | 285.9 | 3222 | 11.3 |
| Comparative example 1 | — | — | — | 384.1 | 1925.7 | 5.0 | 778.0 | 2232.3 | 2.9 |
| Comparative example 2 | LC2 | MN2 | 90:10 | 49.4 | 564.0 | 11.4 | 109.0 | 882.0 | 8.1 |
| Comparative example 3 | LC1 | MN1 | 90:10 | 90.6 | 671.5 | 7.4 | 151.6 | 1012.4 | 6.7 |

Refractive Index of the Material

Table 2 illustrates refractive index evaluation result of the liquid crystal and the monomer.

TABLE 2

| Material | | Ordinary light refractive index ($n_o$) | Extraordinary light refractive index ($n_e$) |
| --- | --- | --- | --- |
| Liquid crystal | LC1 | 1.513 | 1.7138 |
|  | LC2 | 1.496 | 1.656 |
| Monomer | MN1 | 1.505 | 1.664 |
|  | MN2 | 1.502 | 1.639 |

Examples 1 to 4

Figure 24:
FIG. 24 is a view illustrating an example of a polarization microscope image of a bulk when a voltage is applied to a cell of Example 1.

In Examples 1 to 4, a cell was formed by using a monomer mixed liquid crystal previously formed so that the materials having the refractive index illustrated in Table 2 became the weight ratio illustrated in Table 1. In all cells, each pretilt angle was from 1.0 degrees to 1.5 degrees both inclusive, and each optical axis when a voltage was not applied was from 1.0 degrees to 1.5 degrees both inclusive from the cell surface (light guide plate surface). The cell was arranged so that the optical axis was in parallel with the end face into which white LED enters, and luminance evaluation was made. Further, retardation was measured by changing an incident angle while applying a voltage to all cells. In the result, it was confirmed that liquid crystal was tilted while being in parallel with the LED incident end face. FIG. 24 illustrates a polarization microscope image observed while applying a voltage to the cell of Example 1. From FIG. 24, it was found that the bulk had a linear texture along the rubbing direction.

Comparative Example 1

Figure 25:
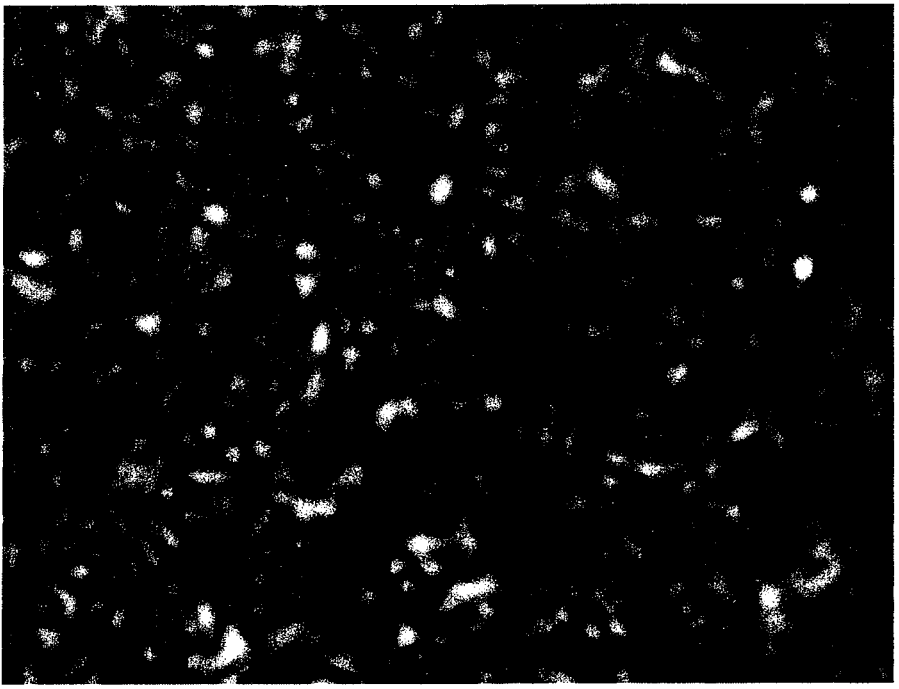
FIG. 25 is a view illustrating an example of a polarization microscope image of a bulk when a voltage is applied to a cell of Comparative example 1.

In Comparative example 1, a cell was formed in the same manner as that of Example 1, except that a normal PDLC material produced by DIC Co., "PNM-170" was used and an alignment film not provided with rubbing was used. As a result of ellipsometer evaluation, pretilt did not exist, and liquid crystal was not aligned by observation with the use of a polarization microscope when a voltage was not applied. When a voltage was applied, the liquid crystal was transparent in the normal line direction of the cell surface (light guide plate surface), was clouded in all diagonal directions, and was similarly clouded in all orientations. That is, optical axis existed at random to the LED incident end face when a voltage was not applied. FIG. 25 illustrates a polarization microscope image observed while applying a voltage to the cell of Comparative example 1. From FIG. 25, it was found that the bulk had a spherical texture.

Comparative Example 2

In Comparative example 2, a cell was formed in the same manner as that of Example 1, except that a vertical alignment film not provided with rubbing was used as an alignment film. Pretilt was a level equal to or under the measurement limit, and was aligned almost perpendicular to the normal line of the substrate. Further, it was confirmed that tilt orientation of the liquid crystal while being applied with a voltage was at random.

Comparative Example 3

In Comparative example 3, the cell formed in Example 1 was arranged so that the LED incident end face was perpendicular to the optical axis, and luminance evaluation was made.

From Table 1, it is found that in Examples 1 to 4, white luminance is higher and modulation ratio is higher than in all comparative examples. Further, it is found that in the case where Example 1 is compared to Comparative example 3, even if the same cell is used, in the case where the direction of liquid crystal rise by a voltage is in parallel with the incident light ray direction, white luminance is higher. Further, it is regarded that since the tilt orientation of the liquid crystal is at random in Comparative examples 1 and 2, white luminance and modulation ratio are low.

It should be understood that various changes and modifications to the presently preferred embodiments described herein will be apparent to those skilled in the art. Such changes and modifications can be made without departing The application is claimed as follows:

1. An illuminating device comprising:
a light guide plate;
a light source arranged on a side face of the light guide plate; and
a light modulation device that is arranged on a surface or an inside of the light guide plate and that is bonded to the light guide plate, wherein the light modulation device has a pair of transparent substrates that is distanced from each other and arranged opposite to each other, a pair of electrodes provided on each surface of the pair of transparent substrates, and a light modulation layer provided in a gap between the pair of transparent substrates,
the light modulation layer has a first region and a second region that have optical anisotropy and that have each response speed to an electric field different from each other,
the first region has a structure in which an optical axis of the first region is in parallel with a light incident face into which light of the light source enters of side faces of the light guide plate and crosses with the surface of the transparent substrates at a first angle when a voltage is not applied between the pair of electrodes, and has a structure in which the optical axis of the first region is in parallel with the light incident face and crosses with the surface of the transparent substrates at a second angle larger than the first angle when a voltage is applied between the pair of electrodes, and
the second region has a structure in which an optical axis of the second region is in parallel with the light incident face and crosses with the surface of the transparent substrates at the first angle without relation to presence of voltage application between the pair of electrodes.

2. The illuminating device according to claim 1, wherein the first region mainly contains a liquid crystal material, and the second region mainly contains a polymer material.

3. The illuminating device according to claim 2, wherein the light modulation device has a horizontal alignment film between the electrode and the light modulation layer.

4. The illuminating device according to claim 3, wherein when a liquid crystal molecule is in contact with a surface of the horizontal alignment film and an electric field is not applied from outside to the liquid crystal molecule, the horizontal alignment film has characteristics to give a pretilt angle to the liquid crystal molecule so that an optical axis of the liquid crystal molecule crosses with the surface of the transparent substrates at the first angle and is in parallel with the light incident face.

5. The illuminating device according to claim 1, wherein the light modulation layer has anisotropic scattering characteristics in which scattering in a thickness direction of the light modulation layer is larger than scattering in a direction in parallel with the light incident face.

6. The illuminating device according to claim 5, wherein the second region has a linear structure having a long axis in a direction that is in parallel with the light incident face and that crosses with the surface of the transparent substrate at the first angle.

7. The illuminating device according to claim 2, wherein the second region has a linear structure or a porous structure that does not respond to an electric field, or a rod-like structure having a response speed lower than a response speed of the first region.

8. The illuminating device according to claim 4, wherein the second region is formed by polymerizing a polymerizable material aligned by an operation of the horizontal alignment film by at least one of heat and light.

9. The illuminating device according to claim 1, wherein ordinary light refractive index of the first region is equal to ordinary light refractive index of the second region, and extraordinary light refractive index of the first region is equal to extraordinary light refractive index of the second region.

10. The illuminating device according to claim 1, wherein the light modulation device has a plurality of the pair of electrodes,
out of the light modulation device, an opposed section between the electrode provided on one transparent substrate side and the electrode provided on the other transparent substrate side constitute a light modulation cell, and
a drive section that controls magnitude of a voltage applied to the pair of electrodes of each light modulation cell so that the optical axis of the first region is in parallel with the optical axis of the second region in one light modulation cell, and the optical axis of the first region crosses with the optical axis of the second region in another light modulation cell is included.

11. The illuminating device according to claim 1, wherein out of the pair of electrodes, at least the electrode on an upper face side of the illuminating device is made of a transparent conductive material.

12. The illuminating device according to claim 1, wherein out of the pair of electrodes, at least the electrode on a bottom face side of the illuminating device is made of a metal.

13. The illuminating device according to claim 1 comprising:
a reflective plate on a bottom face side of the illuminating device.

14. An illuminating device comprising:
a light guide plate;
a light source arranged on a side face of the light guide plate; and
a light modulation device that is arranged on a surface or an inside of the light guide plate and that is bonded to the light guide plate,
wherein the light modulation device has a pair of transparent substrates that is distanced from each other and arranged opposite to each other, a pair of electrodes provided on each surface of the pair of transparent substrates, and a light modulation layer provided in a gap between the pair of transparent substrates,
the light modulation layer has a third region and a fourth region that have optical anisotropy and that have each response speed to an electric field different from each other,
the third region has a structure in which an optical axis of the third region is in parallel with a light incident face into which light of the light source enters of side faces of the light guide plate and crosses with the surface of the transparent substrates at a third angle when a voltage is not applied between the pair of electrodes, and has a structure in which the optical axis of the third region is in parallel with the light incident face and crosses with the surface of the transparent substrates at a fourth angle smaller than the third angle or is in parallel with the surface of the transparent substrate when a voltage is applied between the pair of electrodes, and
the fourth region has a structure in which an optical axis of the fourth region is in parallel with the light incident face and crosses with the surface of the transparent substrates at the third angle without relation to presence of voltage application between the pair of electrodes.

15. The illuminating device according to claim 14, wherein the third region mainly contains a liquid crystal material, and the fourth region mainly contains a polymer material.

16. The illuminating device according to claim 15, wherein the light modulation device has a vertical alignment film between the electrode and the light modulation layer.

17. The illuminating device according to claim 16, wherein when a liquid crystal molecule is in contact with a surface of the vertical alignment film and an electric field is not applied from outside to the liquid crystal molecule, the vertical alignment film has characteristics to give a pretilt angle to the liquid crystal molecule so that an optical axis of the liquid crystal molecule crosses with the surface of the transparent substrates at the third angle and is in parallel with the light incident face.

18. The illuminating device according to claim 17, wherein the fourth region is formed by polymerizing a polymerizable material aligned by an operation of the vertical alignment film by at least one of heat and light.

19. A display unit comprising:
   a display panel that has a plurality of pixels arranged in a matrix state in which the plurality of pixels are driven based on an image signal; and
   an illuminating device that illuminates the display panel,
   wherein the illuminating device has a light guide plate, a light source arranged on a side face of the light guide plate, and a light modulation device that is arranged on a surface or an inside of the light guide plate and that is bonded to the light guide plate sequentially from the display panel side,
   the light modulation device has a pair of transparent substrates that is distanced from each other and arranged opposite to each other, a pair of electrodes provided on each surface of the pair of transparent substrates, and a light modulation layer provided in a gap between the pair of transparent substrates,
   the light modulation layer has a first region and a second region that have optical anisotropy and that have each response speed to an electric field different from each other,
   the first region has a structure in which an optical axis of the first region is in parallel with a light incident face into which light of the light source enters of side faces of the light guide plate and crosses with the surface of the transparent substrates at a first angle when a voltage is not applied between the pair of electrodes, and has a structure in which the optical axis of the first region is in parallel with the light incident face and crosses with the surface of the transparent substrates at a second angle larger than the first angle when a voltage is applied between the pair of electrodes, and
   the second region has a structure in which an optical axis of the second region is in parallel with the light incident face and crosses with the surface of the transparent substrates at the first angle without relation to presence of voltage application between the pair of electrodes.

20. A display unit comprising:
   a display panel that has a plurality of pixels arranged in a matrix state in which the plurality of pixels are driven based on an image signal; and
   an illuminating device that illuminates the display panel,
   wherein the illuminating device has a light guide plate, a light source arranged on a side face of the light guide plate, and a light modulation device that is arranged on a surface or an inside of the light guide plate and that is bonded to the light guide plate sequentially from the display panel side,
   the light modulation device has a pair of transparent substrates that is distanced from each other and arranged opposite to each other, a pair of electrodes provided on each surface of the pair of transparent substrates, and a light modulation layer provided in a gap between the pair of transparent substrates,
   the light modulation layer has a third region and a fourth region that have optical anisotropy and that have each response speed to an electric field different from each other,
   the third region has a structure in which an optical axis of the third region is in parallel with a light incident face into which light of the light source enters of side faces of the light guide plate and crosses with the surface of the transparent substrates at a third angle when a voltage is not applied between the pair of electrodes, and has a structure in which the optical axis of the third region is in parallel with the light incident face and crosses with the surface of the transparent substrates at a fourth angle smaller than the third angle or is in parallel with the surface of the transparent substrate when a voltage is applied between the pair of electrodes, and
   the fourth region has a structure in which an optical axis of the fourth region is in parallel with the light incident face and crosses with the surface of the transparent substrates at the third angle without relation to presence of voltage application between the pair of electrodes.

* * * * *